(12) United States Patent
Yokoshima et al.

(10) Patent No.: US 11,393,643 B2
(45) Date of Patent: Jul. 19, 2022

(54) ELECTROCHEMICAL DEVICE AND METHOD OF PRODUCING THE SAME

(71) Applicant: TAIYO YUDEN CO., LTD., Tokyo (JP)

(72) Inventors: Katsunori Yokoshima, Takasaki (JP); Hiroto Mori, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 493 days.

(21) Appl. No.: 16/581,684

(22) Filed: Sep. 24, 2019

(65) Prior Publication Data

US 2020/0106126 A1    Apr. 2, 2020

(30) Foreign Application Priority Data

Sep. 28, 2018  (JP) .............................. JP2018-184074
Sep. 28, 2018  (JP) .............................. JP2018-184075

(51) Int. Cl.

| | | |
|---|---|---|
| *H01G 11/82* | (2013.01) | |
| *H01M 10/0525* | (2010.01) | |
| *H01G 11/80* | (2013.01) | |
| *H01G 11/84* | (2013.01) | |
| *H01G 11/06* | (2013.01) | |
| *H01M 10/0587* | (2010.01) | |
| *H01M 10/04* | (2006.01) | |
| *H01M 50/538* | (2021.01) | |

(Continued)

(52) U.S. Cl.
CPC .............. *H01G 11/82* (2013.01); *H01G 11/06* (2013.01); *H01G 11/80* (2013.01); *H01G 11/84* (2013.01); *H01M 10/0431* (2013.01); *H01M 10/0525* (2013.01); *H01M 10/0587* (2013.01); *H01M 50/3425* (2021.01); *H01M 50/538* (2021.01); *H01M 50/578* (2021.01); *H01G 11/74* (2013.01)

(58) Field of Classification Search
CPC ................................ H01G 11/74; H01G 11/82
USPC ........................................................ 361/502
See application file for complete search history.

(56) References Cited

U.S. PATENT DOCUMENTS

2003/0194601 A1 * 10/2003 Lei ...................... H01M 50/578
                                                                       429/61
2018/0130994 A1    5/2018 Yamaguchi et al.

FOREIGN PATENT DOCUMENTS

JP       05074432 A  *  3/1993
JP       06196150 A  *  7/1994 .............. H01M 2/34
(Continued)

*Primary Examiner* — Eric W Thomas
(74) *Attorney, Agent, or Firm* — Law Office of Katsuhiro Arai

(57) ABSTRACT

An electrochemical device includes: an electricity storage device that includes a positive electrode, a negative electrode, a separator, and a plurality of lead plates electrically connected to the positive electrode or the negative electrode, the positive electrode and the negative electrode being stacked via the separator and wound; a connection plate having a first surface on a side of the electricity storage device and a second surface opposite to the first surface, the plurality of lead plates being stacked and welded to the first surface; a rupture disc connected to the second surface of the connection plate; and an insulator that abuts on a first area that is an outer peripheral area of the second surface and insulates the connection plate and the rupture disc from each other, the plurality of lead plates being welded to a second area opposite to the first area of the first surface.

8 Claims, 25 Drawing Sheets

(51) Int. Cl.
  *H01M 50/342* (2021.01)
  *H01M 50/578* (2021.01)
  *H01G 11/74* (2013.01)

(56) References Cited

FOREIGN PATENT DOCUMENTS

| | | | |
|---|---|---|---|
| JP | 2000182656 A | * | 6/2000 |
| JP | 2007335232 A | | 12/2007 |
| WO | 2016174811 A1 | | 11/2016 |

\* cited by examiner

ELECTROCHEMICAL DEVICE AND METHOD OF PRODUCING THE SAME

CROSS REFERENCE TO RELATED APPLICATIONS

This application claims the benefit of Japanese Priority Patent Application JP 2018-184074 filed Sep. 28, 2018, the entire contents of which are incorporated herein by reference.

BACKGROUND

The present disclosure relates to an electrochemical device including a conduction path joined by resistance welding and a method of producing the same.

As an electrochemical device such as a lithium ion capacitor, a wound type electrochemical device in which a positive electrode and a negative electrode separated via a separator are wound is often used. Each of the positive electrode and the negative electrode is connected to a terminal via a lead member.

In the electrochemical device, by elongating the electrode, the capacity can be increased and the resistance can be reduced. However, in the case of elongating the electrode, it is difficult to achieve sufficient output characteristics due to the length of the electrode. In order to solve the problem, a plurality of lead members is connected to the electrode, and the electrode and the terminal are connected to each other via the plurality of lead members.

For example, Japanese Patent Application Laid-open No. 2007-335232 discloses a secondary battery in which a plurality of lead plates is stacked at one point and the overlapping portion is connected to a sealing body. Further, WO 2016/174811 discloses a method of connecting a plurality of lead plates to a sealing body via a current collector.

SUMMARY

However, direct connection to the sealing body by the method disclosed in Japanese Patent Application Laid-open No. 2007-335232 is difficult and is not feasible. Further, there is a possibility that the method disclosed in WO 2016/174811 leads to an increase in the number of parts and reduction in output performance due to the connection resistance between the current collector plate and the lead plate.

In view of the above-mentioned circumstances, it is desired to provide an electrochemical device that includes a conduction path having low resistance and is capable of achieving high output characteristics, and a method of producing the same.

In accordance with an embodiment of the present disclosure, there is provided an electrochemical device including: an electricity storage device; a connection plate; a rupture disc; and an insulator.

The electricity storage device includes a positive electrode, a negative electrode, and a separator, the positive electrode and the negative electrode being stacked via the separator and wound, the electricity storage device further including a plurality of lead plates electrically connected to one of the positive electrode and the negative electrode.

The connection plate has a first main surface on a side of the electricity storage device and a second main surface opposite to the first main surface, the plurality of lead plates being stacked and welded to the first main surface.

The rupture disc is connected to the second main surface of the connection plate.

The insulator abuts on a first area and insulates the connection plate and the rupture disc from each other, the first area being an outer peripheral area of the second main surface.

The plurality of lead plates is welded to a second area of the first main surface, the second area being opposite to the first area.

With this configuration, since the rupture disc is connected to the second main surface of the connection plate, it is necessary to perform series resistance welding in which a current flows between the welding electrodes caused to abut on the lead plate on the side of the first main surface in order to join the lead plate to the first main surface. Note that in the case where the lead plate to be welded incudes a plurality of lead plates, it is necessary to press the welding electrodes with a strong force to reduce the contact resistance. With the above-mentioned configuration, there is the first area in which the insulator that insulates the connection plate and the rupture disc with each other abuts on the outer peripheral area of the second main surface. For this reason, by performing resistance welding in the second area of the first main surface, which is opposite to the first area, it is possible to prevent the connection plate from being damaged even in the case where the welding electrodes are pressed with a strong force. Therefore, it is possible to press the welding electrodes with a strong force to reliably join the lead plates to the connection plate.

The plurality of lead plates may be welded to the connection plate at two portions in the second area.

The number of the plurality of lead plates welded to the connection plate may be not less than three.

The electrochemical device may be a lithium ion capacitor.

A rib may be provided on the first main surface of the connection plate.

The first main surface may have a circular shape, and the rib may be formed along a radius of the connection plate.

The connection plate may include a through hole in communication with the first main surface and the second main surface, and the rib may be provided between a welding portion of the plurality of lead plates and the through hole.

In accordance with an embodiment of the present disclosure, there is provided a method of producing an electrochemical device, including: preparing an electricity storage device that includes a positive electrode, a negative electrode, and a separator, the positive electrode and the negative electrode being stacked via the separator and wound, the electricity storage device further including a plurality of lead plates electrically connected to one of the positive electrode and the negative electrode, a connection plate having a first main surface on a side of the electricity storage device and a second main surface opposite to the first main surface, a rupture disc connected to the second main surface of the connection plate, and an insulator that abuts on a first area and insulates the connection plate and the rupture disc from each other, the first area being an outer peripheral area of the second main surface.

The plurality of lead plates is stacked and the plurality of stacked lead plates is caused to abut on the first main surface.

A first welding electrode and a second welding electrode are caused to abut on the plurality of lead plates in an electrode contact area including a second area of the first main surface, the second area being opposite to the first area, and a current is applied between the first welding electrode and the second welding electrode to weld the plurality of lead plates to the connection plate in the second area.

As described above, in accordance with the present disclosure, it is possible to provide an electrochemical device that includes a conduction path having low resistance and is capable of achieving high output characteristics, and a method of producing the same.

These and other objects, features and advantages of the present disclosure will become more apparent in light of the following detailed description of best mode embodiments thereof, as illustrated in the accompanying drawings.

DETAILED DESCRIPTION OF EMBODIMENTS

An electrochemical device according to an embodiment of the present disclosure will be described.

First Embodiment

Configuration of Electrochemical Device

Figure 1:
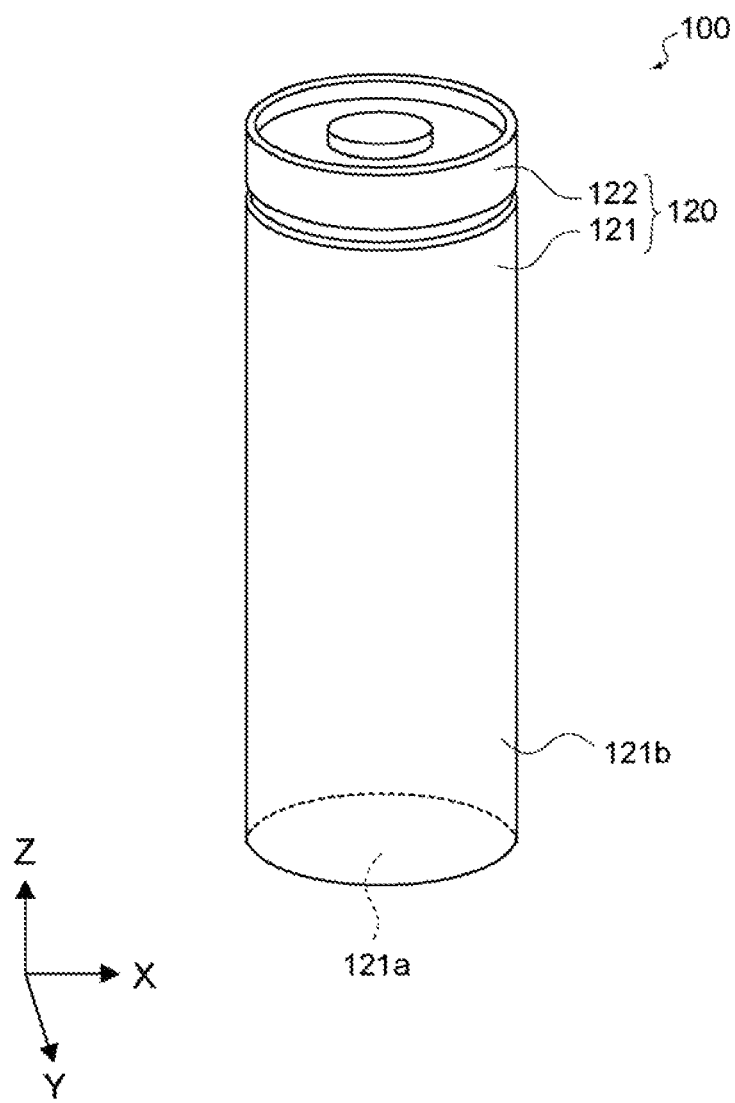
FIG. 1 is a perspective view showing an electrochemical device according to a first embodiment of the present disclosure.
Figure 2:
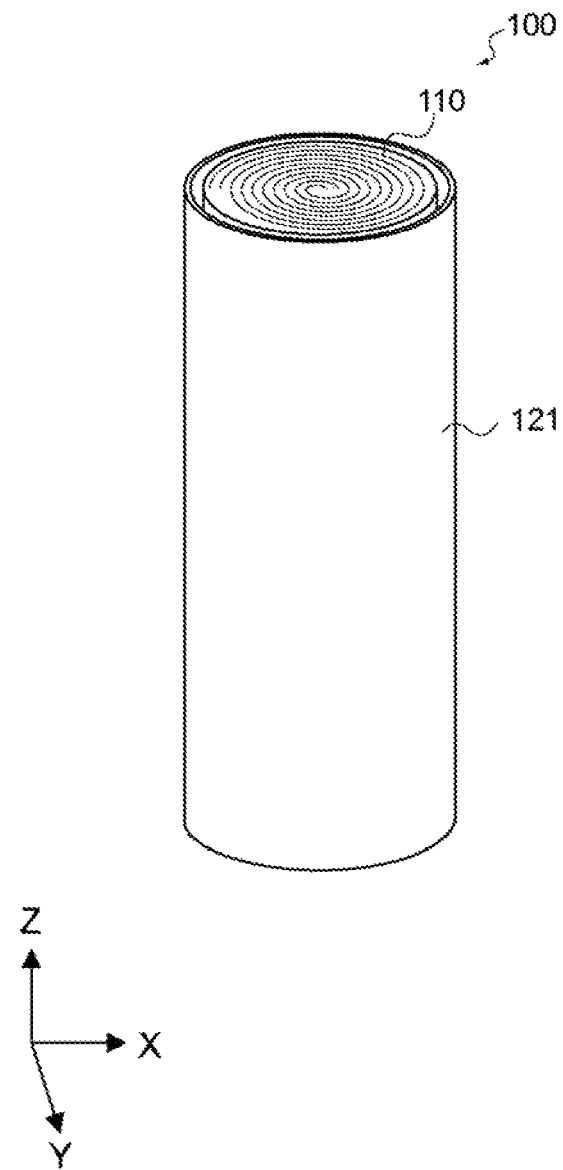
FIG. 2 is a perspective view showing a partial configuration of the electrochemical device.

FIG. 1 is a perspective view showing an electrochemical device 100 according to a first embodiment of the present disclosure, and FIG. 2 is a perspective view showing a partial configuration of the electrochemical device 100. Note that in the following drawings, X-, Y-, and Z-directions are three directions orthogonal to each other.

The electrochemical device 100 only needs to be a device capable of charging and discharging, and may be any of various electrochemical devices such as a lithium ion capacitor, an electric double layer capacitor, and a lithium ion secondary battery.

As shown in FIG. 1 and FIG. 2, the electrochemical device 100 includes an electricity storage device 110 and a container 120. The electrochemical device 100 has a cylindrical shape, and can have a diameter (X-Y direction) of 18 mm and a length (Z-direction) of 65 mm, for example.

As shown in FIG. 1, the container 120 includes an exterior can 121 and a sealing body 122.

The exterior can 121 is formed of metal, and includes a can bottom portion 121a and a side wall portion 121b. The can bottom portion 121a has a disk shape. The side wall portion 121b has a cylindrical shape that is continuous with the periphery of the can bottom portion 121a. The side wall portion 121b is covered by an insulating film.

The sealing body 122 is formed of metal and joined to the side wall portion 121b to seal the internal space of the exterior can 121. The configuration of the sealing body 122 will be described below.

As shown in FIG. 2, the electricity storage device 110 and an electrolyte (not shown) are housed in the exterior can 121 and sealed by the sealing body 122, thereby forming the electrochemical device 100.

Figure 3:
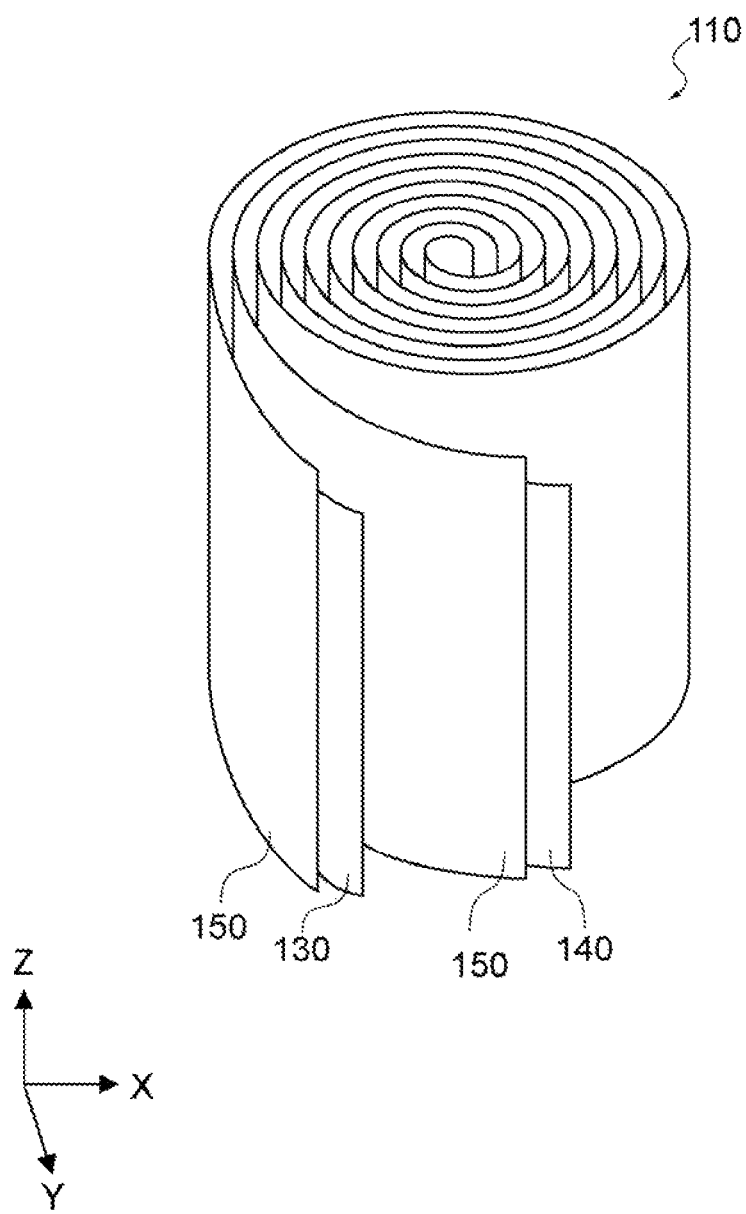
FIG. 3 is a perspective view showing an electricity storage device of the electrochemical device.
Figure 4:
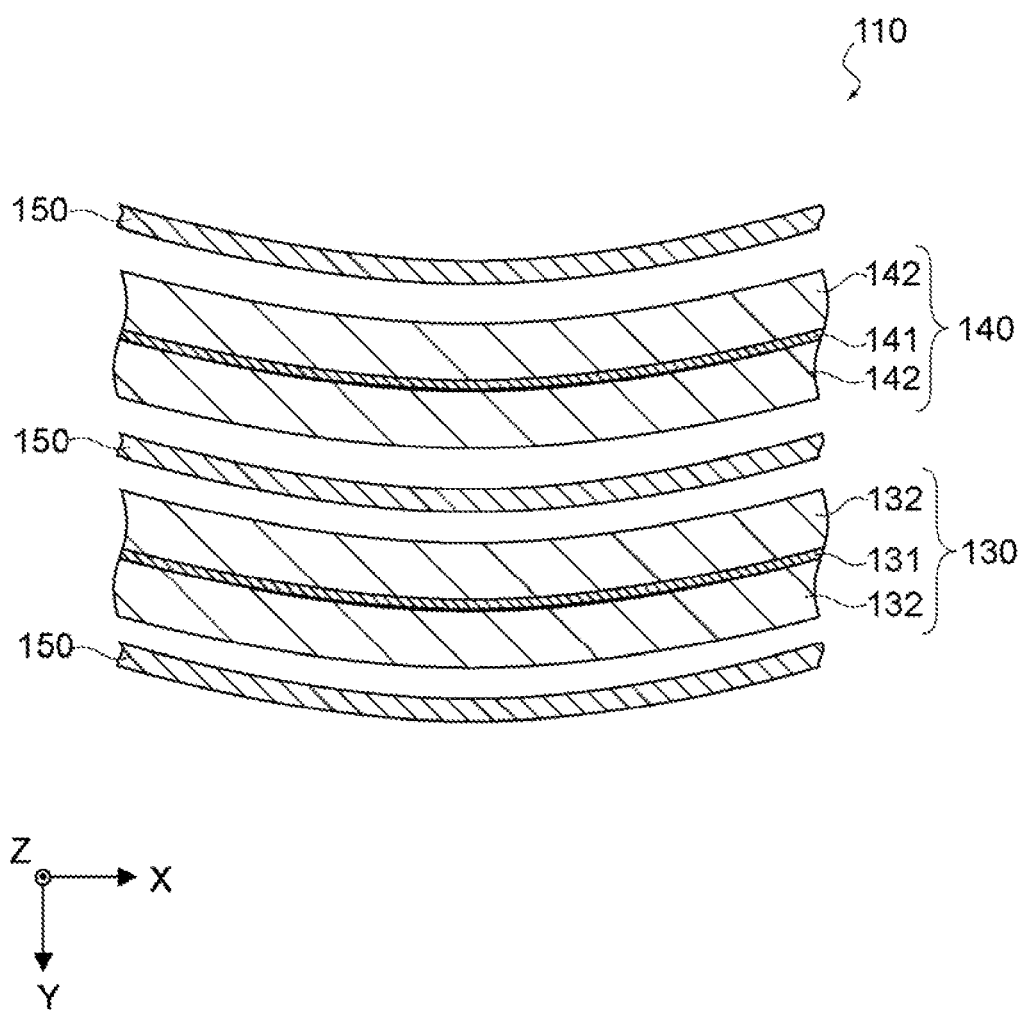
FIG. 4 is a cross-sectional view of the electricity storage device.

FIG. 3 is a perspective view showing the electricity storage device 110. FIG. 4 is an enlarged cross-sectional view of the electricity storage device 110. As shown in the figures, the electricity storage device 110 includes a negative electrode 130, a positive electrode 140, and a separator 150. A stacked body obtained by stacking the negative electrode 130, the positive electrode 140, and the separator 150 is wound to form the electricity storage device 110.

As shown in FIG. 4, the negative electrode 130 includes a negative electrode current collector 131 and a negative electrode active material layer 132. The negative electrode current collector 131 is formed of a conductive material, and can be a metal foil such as a copper foil. It is favorable that the negative electrode current collector 131 includes a metal foil having a surface that is chemically or mechanically roughened or a metal foil in which a through hole is formed.

The negative electrode active material layer 132 is formed on both of the front surface and the back surface of the negative electrode current collector 131. The material of the negative electrode active material layer 132 may be a mixture of a negative electrode active material and a binder resin, and may further contain a conductive aid. The negative electrode active material can be, for example, a carbon-based material such as hard carbon, graphite, and soft carbon.

The binder resin is a synthetic resin that joins a negative electrode active material, and can be, for example, carboxymethylcellulose, styrene butadiene rubber, polyethylene, polypropylene, aromatic polyamide, fluorinated rubber, polyvinylidene fluoride, isoprene rubber, butadiene rubber, or ethylene propylene rubber.

The conductive aid is particles formed of a conductive material, and improves the conductivity with the negative electrode active material. Examples of the conductive aid include a carbon material such as graphite and carbon black. These materials may be used alone, or two or more of them may be used in combination. Note that the conductive aid may be a metal material, a conductive polymer, or the like as long as the material is electrochemically stable and has conductivity.

Figure 5:
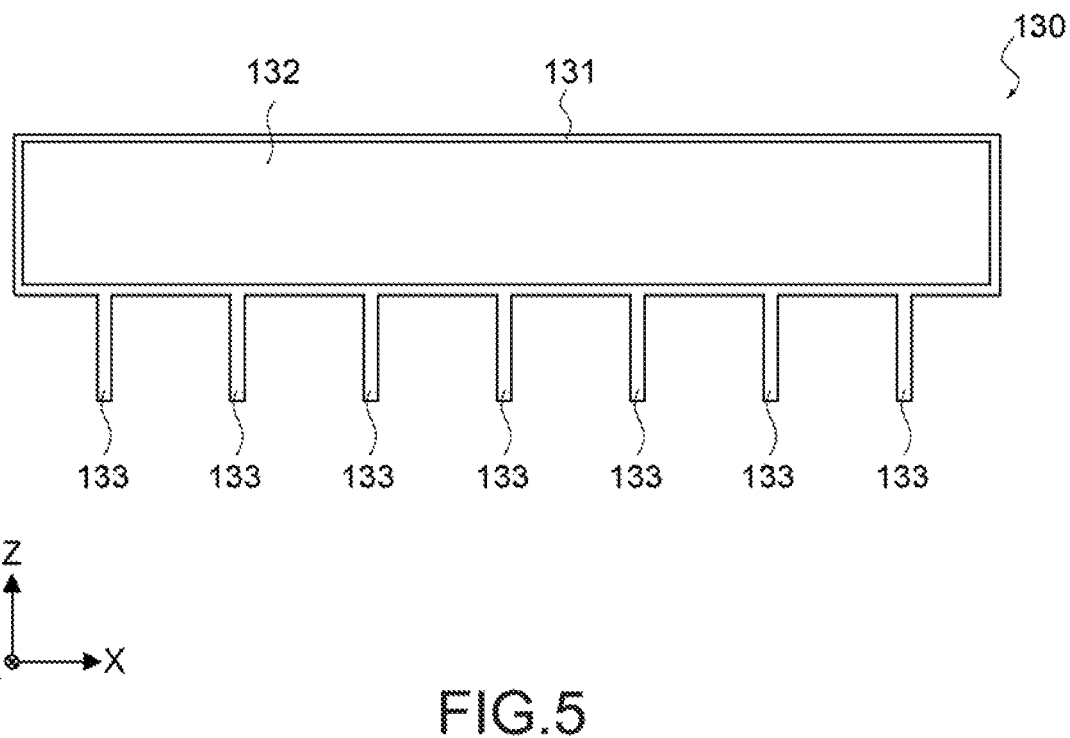
FIG. 5 is a plan view showing a negative electrode of the electricity storage device.

FIG. 5 is a plan view showing the negative electrode 130 before being wound. As shown in FIG. 5, the negative electrode active material layer 132 is stacked on most of the surface of the negative electrode current collector 131. Further, similarly, the negative electrode active material layer 132 (not shown) is stacked also on the back surface of the negative electrode current collector 131.

Further, the negative electrode 130 includes a plurality of negative electrode lead plates 133. A part of the negative electrode current collector 131 projects, thereby forming each of the negative electrode lead plates 133. As will be described below, the negative electrode lead plates 133 are connected to the exterior can 121, and electrically connect the exterior can 121 and the negative electrode 130.

Note that each of the negative electrode lead plates 133 does not necessarily need to be a projecting part of the negative electrode current collector 131, and may be a plate-like or foil-like member electrically connected to the negative electrode current collector 131, which is different from the negative electrode current collector 131. The number of the negative electrode lead plates 133 is not limited to seven shown in FIG. 5, and may be an arbitrary number of one or more.

As shown in FIG. 4, the positive electrode 140 includes a positive electrode current collector 141 and a positive electrode active material layer 142. The positive electrode current collector 141 is formed of a conductive material, and can be a metal foil such as an aluminum foil. It is favorable that the positive electrode current collector 141 includes a metal foil having a surface that is chemically or mechanically roughened or a metal foil in which a through hole is formed.

The positive electrode active material layer 142 is formed on both of the front surface and the back surface of the positive electrode current collector 141. The material of the positive electrode active material layer 142 can be a mixture of a positive electrode active material and a binder resin, and may further contain a conductive aid. Examples of the positive electrode active material include activated carbon, PAS (Polyacenic Semiconductor: polyacenic organic semiconductor), or the like.

The binder resin is a synthetic resin that joins a positive electrode active material, and can be, for example, carboxymethylcellulose, styrene butadiene rubber, polyethylene, polypropylene, aromatic polyamide, fluorinated rubber, polyvinylidene fluoride, isoprene rubber, butadiene rubber, or ethylene propylene rubber.

The conductive aid is particles formed of a conductive material, and improves the conductivity with the positive electrode active material. Examples of the conductive aid include a carbon material such as graphite and carbon black. These materials may be used alone, or two or more of them may be used in combination. Note that the conductive aid may be a metal material, a conductive polymer, or the like as long as the material is electrochemically stable and has conductivity.

Figure 6:
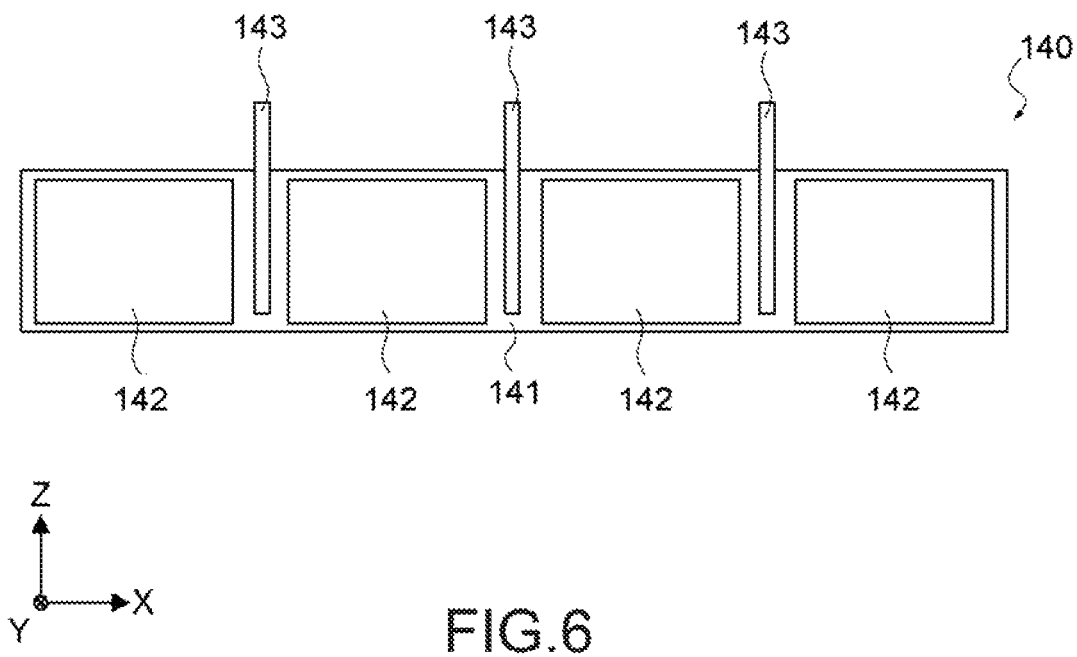
FIG. 6 is a plan view showing a positive electrode of the electricity storage device.

FIG. 6 is a plan view showing the positive electrode 140 before being wound. As shown in FIG. 6, the positive electrode active material layer 142 is stacked on most of the surface of the positive electrode current collector 141. Further, similarly, the positive electrode active material layer 142 (not shown) is stacked also on the back surface of the positive electrode current collector 141.

Further, the positive electrode 140 includes a positive electrode lead plate 143. The positive electrode lead plate 143 is formed of plate-like or foil like metal, and is connected to an area, to which the positive electrode active material layer 142 is not applied, on the positive electrode current collector 141. The positive electrode lead plate 143 is formed of the same material as the positive electrode current collector 141, and can be formed of, for example, aluminum. As will be described below, the positive electrode lead plate 143 is connected to the sealing body 122, and electrically connects the sealing body 122 and the positive electrode 140.

Note that a part of the positive electrode current collector 141 may protrude to form the positive electrode lead plate 143. The number of the positive electrode lead plates 143 is not limited to three shown in FIG. 5, and only needs to be two or more.

The separator 150 is disposed between the negative electrode 130 and the positive electrode 140, insulates the negative electrode 130 and the positive electrode 140, and causes ions contained in the electrolyte to be transmitted therethrough. The separator 150 can be a porous sheet formed of woven fabric, non-woven fabric, glass fiber, cellulose fiber, plastic fiber, or the like.

The electrochemical device 100 is configured as described above. The electrolyte to be housed in the container 120 together with the electricity storage device 110 can be arbitrarily selected in accordance with the type of the electrochemical device 100.

Regarding Electrical Connection Between
Electricity Storage Device and Exterior Can In the electrochemical device 100, the electricity storage device 110 is electrically connected to the container 120, and charging and discharging of the electricity storage device 110 are performed via the container 120.

Figure 7:
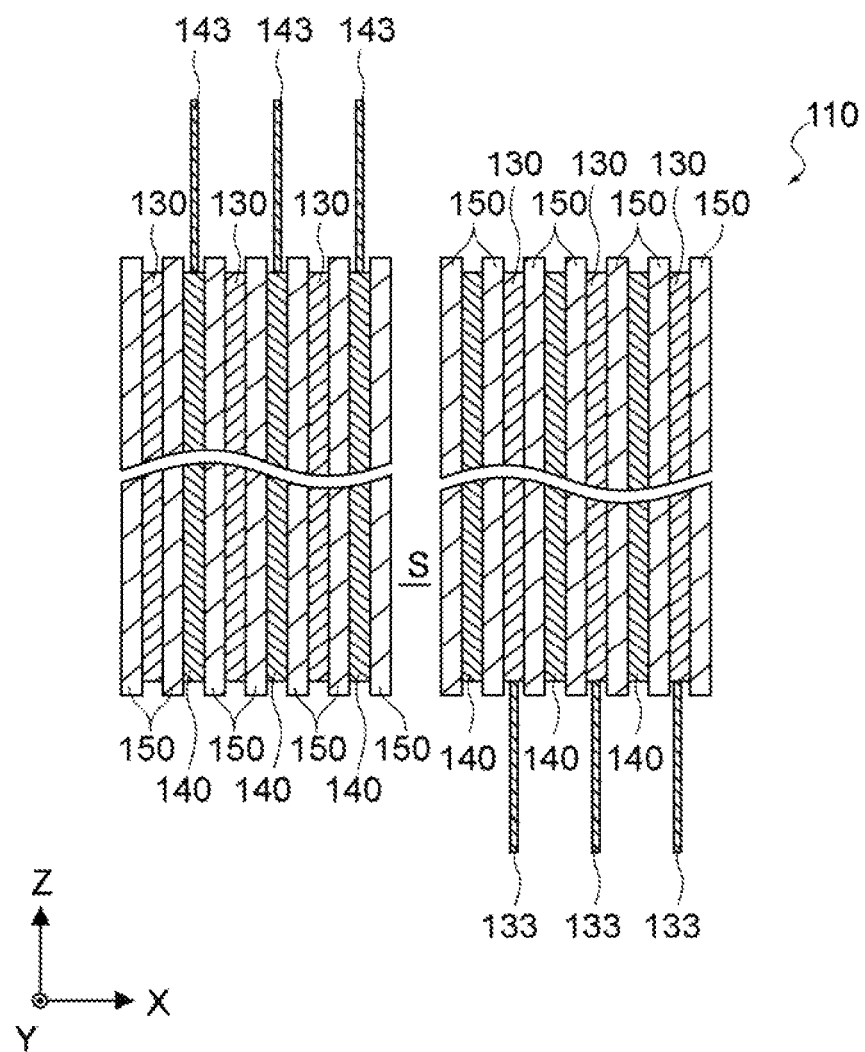
FIG. 7 is a schematic diagram showing a negative electrode lead plate and a positive electrode lead plate of the electricity storage device.

FIG. 7 is a schematic cross-sectional view of the electricity storage device 110. As shown in FIG. 7, the negative electrode 130 and the positive electrode 140 are separated via the separator 150 and wound. As shown in FIG. 7, a hole at the winding center will be referred to as "central hole S". The negative electrode lead plates 133 projects from the negative electrode 130 to one side (downward in FIG. 7) of the electricity storage device 110, and the positive electrode lead plate 143 projects from the positive electrode 140 to the opposite side (upward in FIG. 7).

Figure 8:
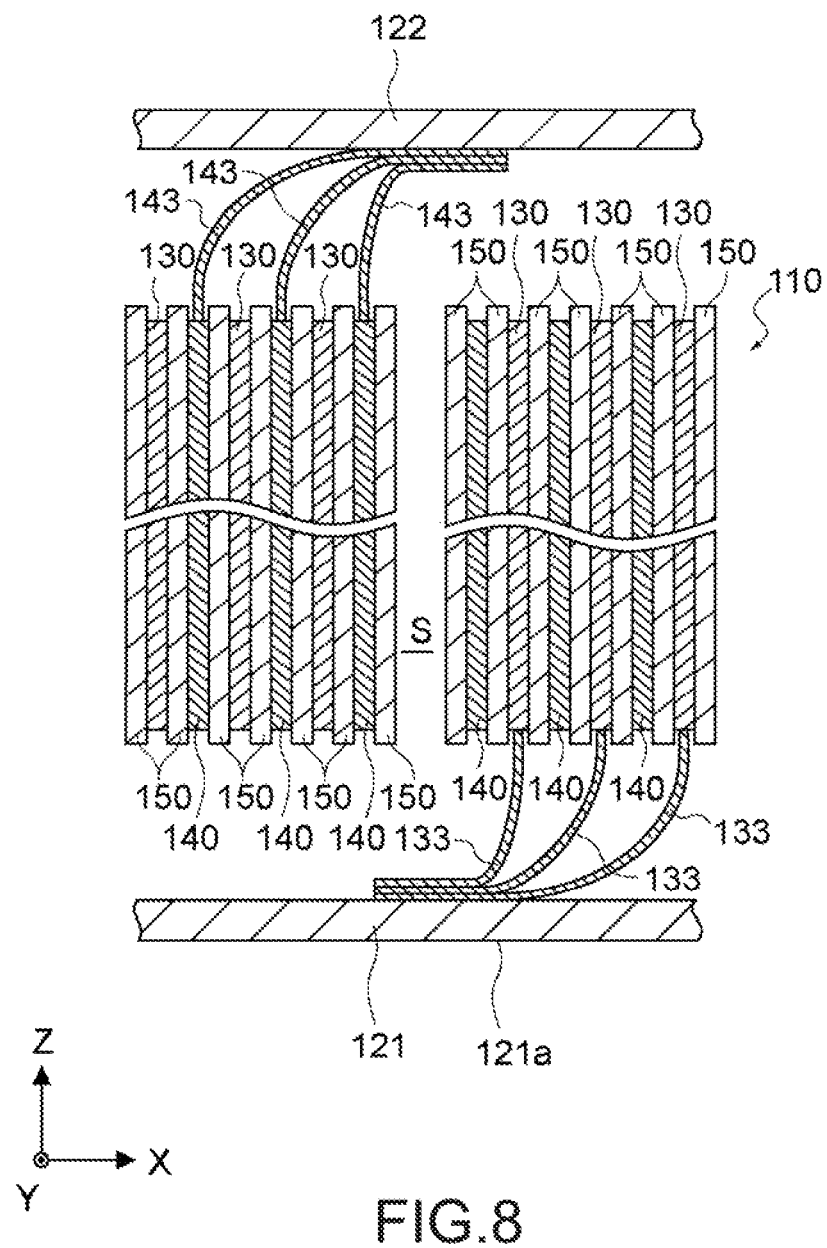
FIG. 8 is a schematic diagram showing a mode of electrical connection between the electricity storage device and a container.

FIG. 8 is a schematic diagram showing the electrical connection between the electricity storage device 110 and the container 120. As shown in FIG. 8, the negative electrode lead plates 133 is joined to the exterior can 121, and the positive electrode lead plate 143 is joined to the sealing body 122. As a result, the can bottom portion 121*a* of the exterior can 121 functions as a negative electrode terminal, and the sealing body 122 functions as a positive electrode terminal.

Note that the positive electrode lead plate 143 and the sealing body 122 are joined by series resistance welding as described below.

Configuration of Sealing Body

Figure 9:
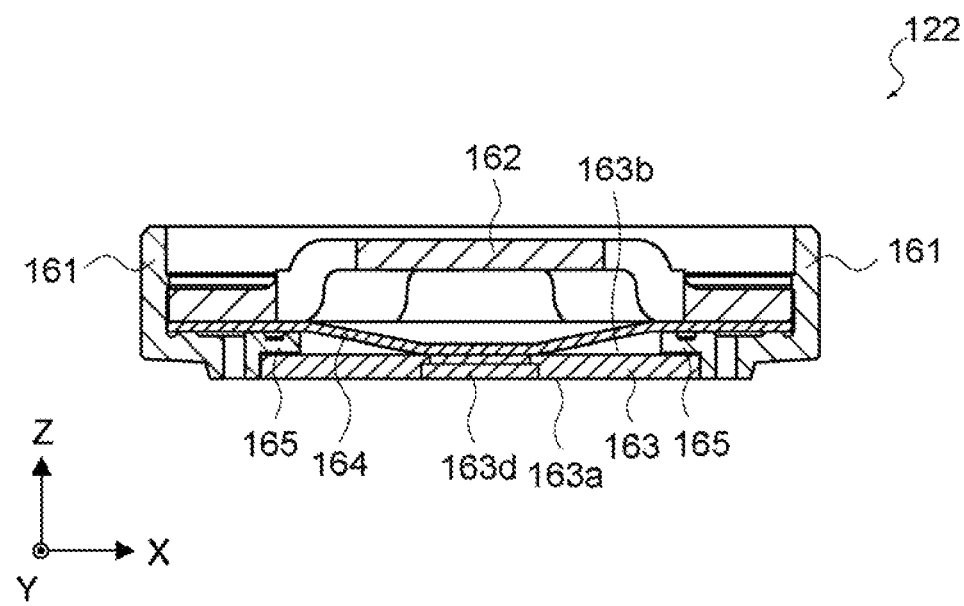
FIG. 9 is a cross-sectional view of a sealing body of the electrochemical device according to the first embodiment of the present disclosure.
Figure 10:
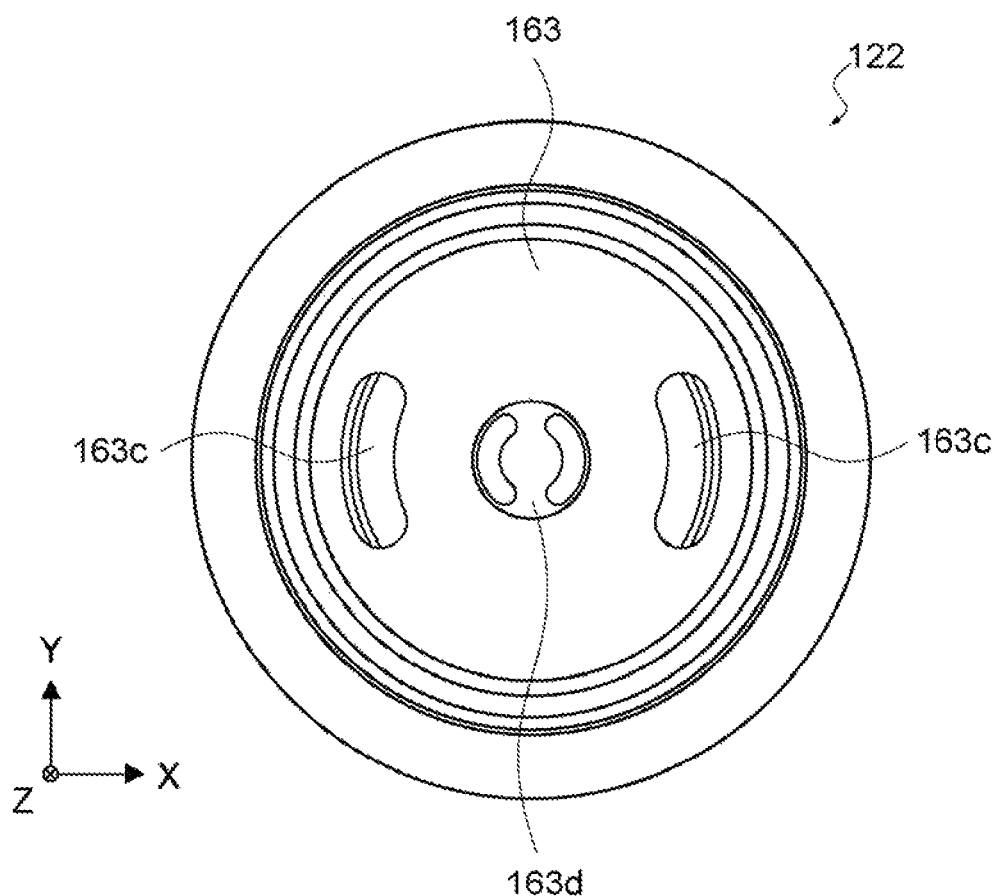
FIG. 10 is a plan view showing the sealing body of the electrochemical device.

FIG. 9 is a cross-sectional view of the sealing body 122. FIG. 10 is a plan view showing the sealing body 122 viewed from the side of the electricity storage device 110.

As shown in the figures, the sealing body 122 includes a frame member 161, an external terminal 162, a connection plate 163, a rupture disc 164, and an insulator 165.

The frame member 161 is fitted to the exterior can 121, and fixes the sealing body 122 to the exterior can 121. The frame member 161 can have an annular shape.

The external terminal 162 is fixed to the frame member 161, and functions as a positive electrode terminal of the electrochemical device 100.

The connection plate 163 is a has a disk shape, is disposed on the side of the electricity storage device 110 (downward in the figure) in the sealing body 122, and is a portion to which the positive electrode lead plate 143 is joined.

Figure 11:
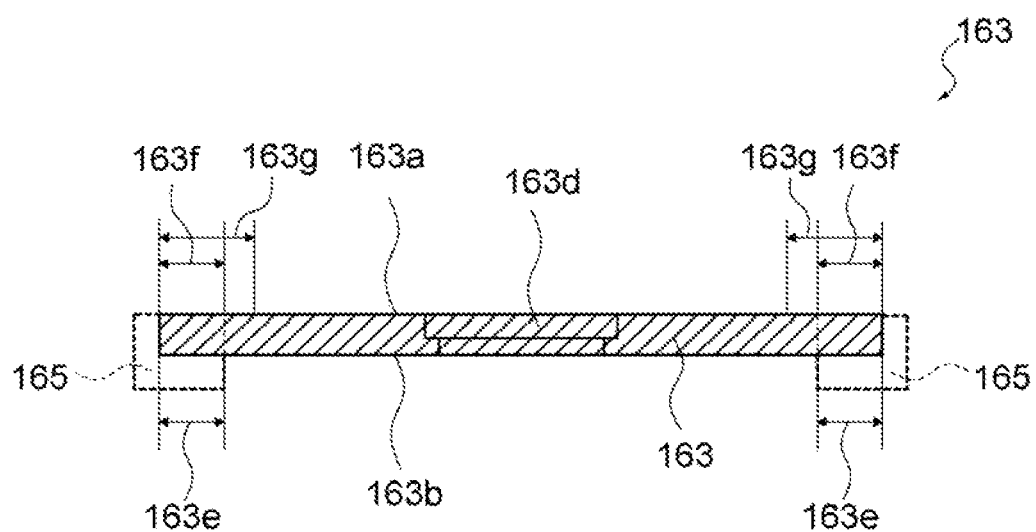
FIG. 11 is a cross-sectional view of a connection plate of the sealing body.

FIG. 11 is a cross-sectional view of the connection plate 163. As shown in FIG. 11, the connection plate 163 includes a first main surface 163*a* and a second main surface 163*b*. The first main surface 163*a* is a surface on the side of the electricity storage device 110, and the second main surface 163*b* is a surface opposite to the first main surface 163*a*.

Further, as shown in FIG. 10, the connection plate 163 includes a through hole 163*c* and a recessed portion 163*d*. The through hole 163*c* is a hole that is in communication with the first main surface 163*a* and the second main surface 163*b*, and gas generated when an abnormality occurs in the electricity storage device 110 passes through the hole. The number and shape of the through holes 163*c* are not particularly limited. The through holes 163*c* are disposed to avoid the area (to be described below) to be welded.

The recessed portion 163*d* is a portion of the connection plate 163, which has a reduced thickness, and is provided at the central portion of the second main surface 163*b*, and the rupture disc 164 is connected to the portion.

The rupture disc 164 is connected to the recessed portion 163*d* in the second main surface 163*b*, and electrically connects the connection plate 163 and the external terminal 162. The connection portion of the rupture disc 164 with the recessed portion 163*d* is broken when gas is generated from the electricity storage device 110, thereby insulating the connection plate 163 and the external terminal 162 from each other.

The insulator 165 is disposed between the rupture disc 164 and the connection plate 163 to insulate the rupture disc 164 and the connection plate 163 from each other. The insulator 165 has an annular shape, and abuts on the outer peripheral area of the second main surface 163*b* as shown in FIG. 11. In the second main surface 163*b*, the area on which the insulator 165 abuts will be referred to as "first area 163*e*".

Figure 12:
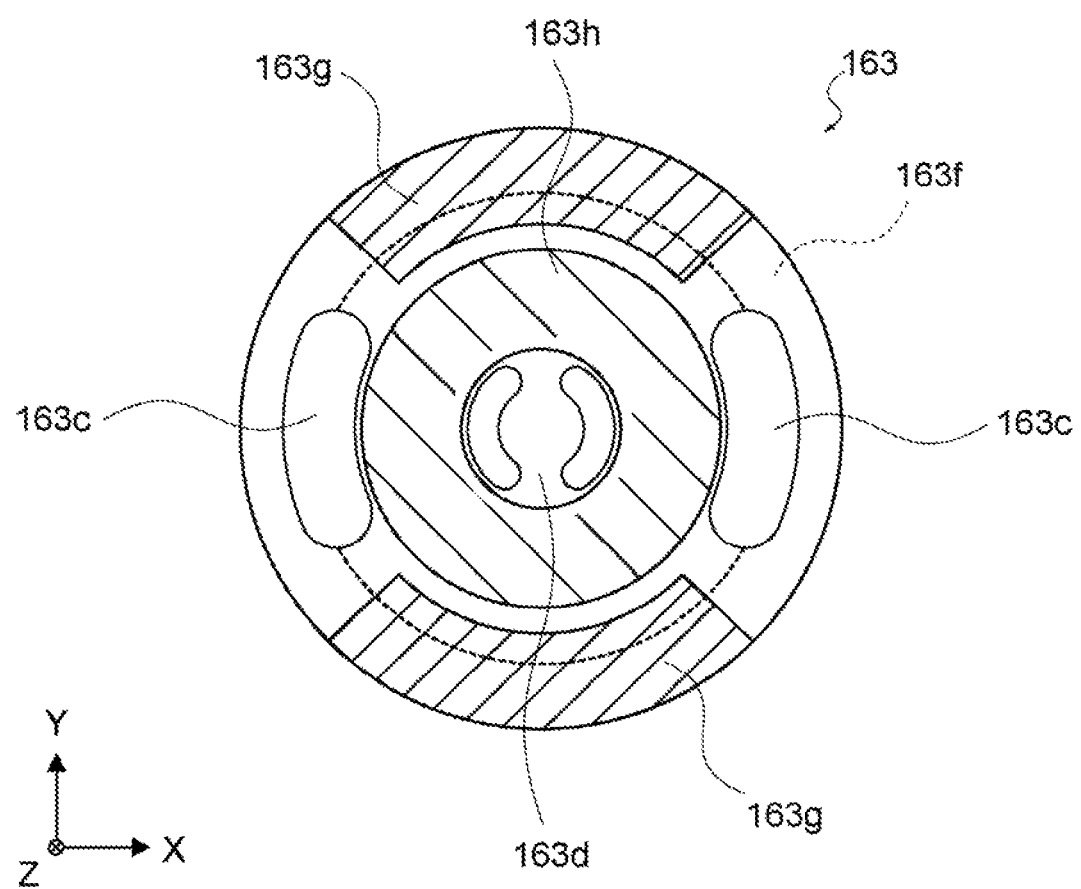
FIG. 12 is a plan view showing the connection plate of the sealing body.

FIG. 12 is a schematic diagram showing the region on the first main surface 163*a*. As shown in FIG. 11 and FIG. 12, on the first main surface 163*a*, an area opposite to the first area 163*e* will be referred to as "second area 163*f*", and an area that includes the second area 163*f* and is separated from the through hole 163*c* will be referred to as "electrode contact area 163*g*".

Further, an area that is on the inner peripheral side of the electrode contact area 163*g* and around the recessed portion 163*d* will be referred to as "third area 163*h*".

The frame member 161, the external terminal 162, the connection plate 163, and the rupture disc 164 are each formed of a metal material, and are each favorably formed of the same material. Examples of such a material include aluminum, an alloy containing aluminum, and stainless steel. The insulator 165 is formed of an insulating material such as a resin.

Regarding Welding of Positive Electrode Lead Plate to Connection Plate

Figure 13:
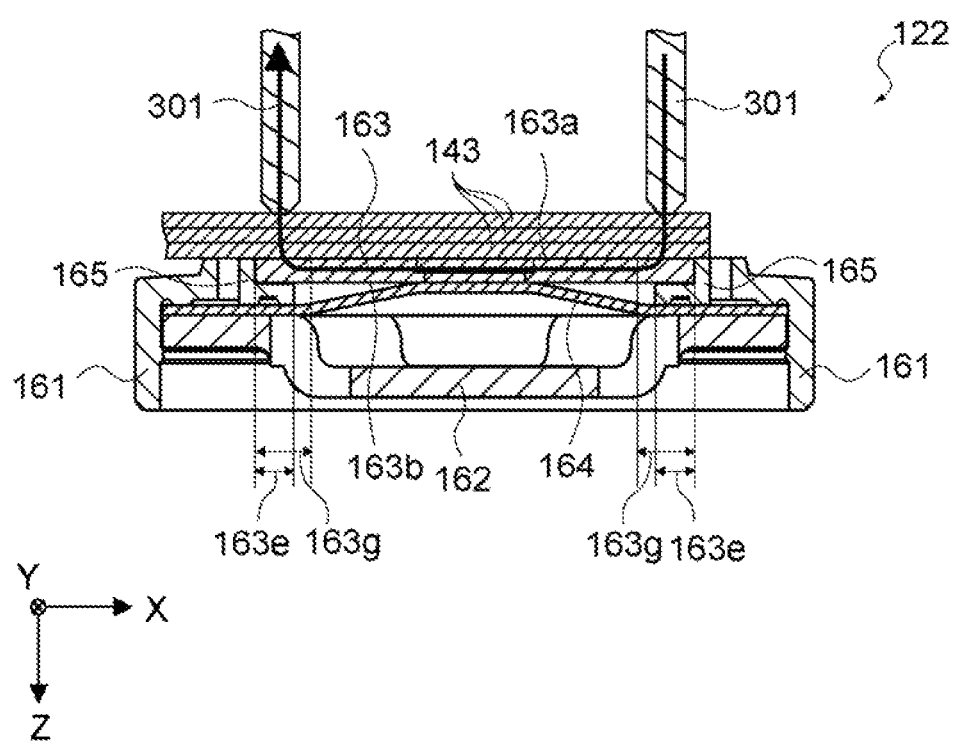
FIG. 13 is a schematic diagram showing a method of resistance welding of a positive electrode lead plate and a connection plate of an electrochemical device according to an embodiment of the present disclosure.
Figure 14:
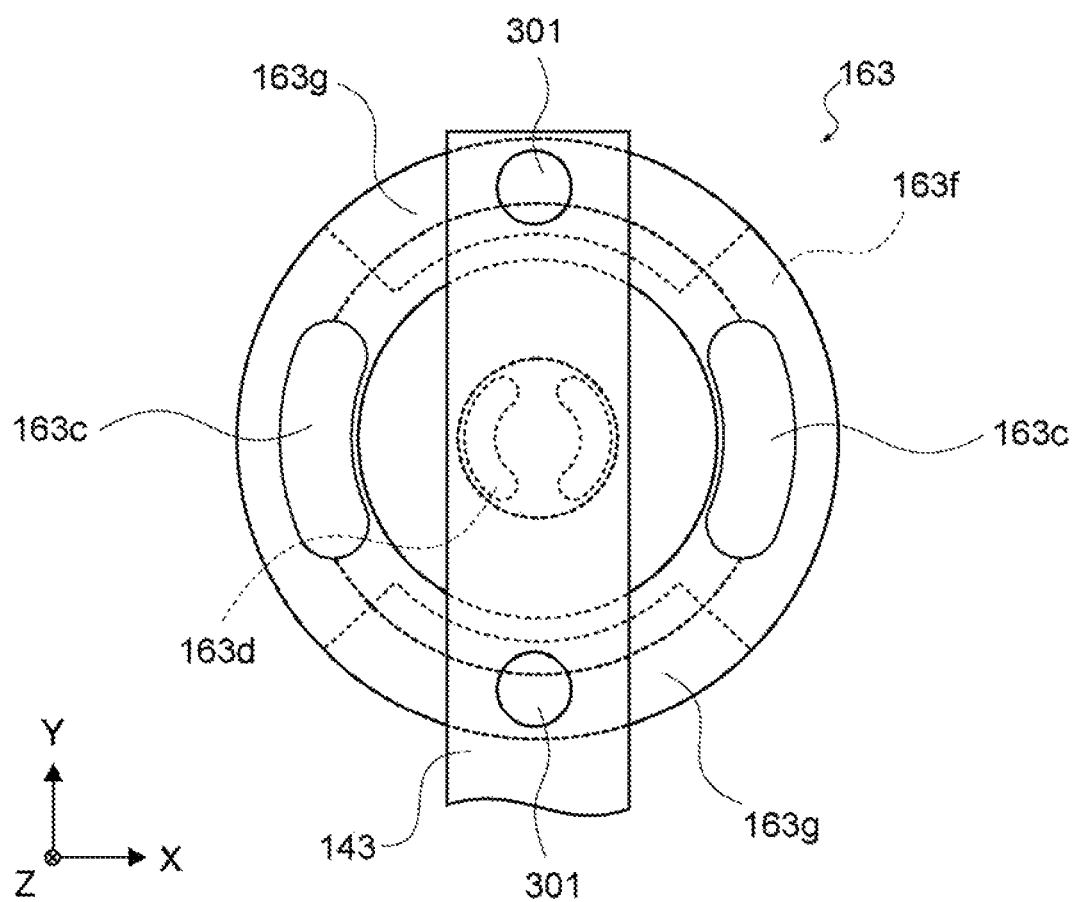
FIG. 14 is a schematic diagram showing a method of resistance welding of the positive electrode lead plate and the connection plate of the electrochemical device.

As described above, the positive electrode lead plate 143 is electrically connected to the sealing body 122. Specifically, the positive electrode lead plate 143 is welded to the connection plate 163 by resistance welding. FIG. 13 is a cross-sectional view when welding the positive electrode lead plate 143 to the connection plate 163, and FIG. 14 is a plan view at this time.

As shown in the figures, at the time of welding, the positive electrode lead plate 143 is stacked and disposed on the first main surface 163*a*, and two welding electrodes 301 are pressed into the positive electrode lead plate 143. In this state, a current is applied between the two welding electrodes 301. As a result, a current flows between the two welding electrodes 301 via the positive electrode lead plate 143 and the connection plate 163 as shown by an arrow. Thus, the positive electrode lead plates 143 are welded, and the positive electrode lead plate 143 and the connection plate 163 are welded (resistance welding).

As described above, the rupture disc 164 and the external terminal 162 are provided on the side of the second main surface 163*b* of the connection plate 163, and a welding electrode cannot be disposed on the side of the second main surface 163*b*. For this reason, it is necessary to perform resistance welding (series resistance welding) by causing the two welding electrodes 301 to abut on the side of the first main surface 163*a* to cause a current to flow between the two electrodes.

Note that in the case where the number of the positive electrode lead plates 143 to be welded is one, resistance welding can be performed by pressing the two welding electrodes 301 into the third area 163*h* (see FIG. 12). However, in the case where the number of the positive electrode lead plates 143 to be welded is two or more, it is necessary to press the welding electrodes 301 into the positive electrode lead plate 143 with a strong force (e.g., 20

N or more) in order to reduce the contact resistance with the welding electrodes 301. At this time, there is a possibility that the connection plate 163 is deformed because there is a space on the back surface side of the third area 163h.

Meanwhile, in the present disclosure, resistance welding is performed so that a welding portion is formed in the second area 163f by pressing the two welding electrodes 301 into the positive electrode lead plate 143 on the electrode contact area 163g. There is the first area 163e on which the insulator 165 abuts on the second main surface 163b that is the back surface of the electrode contact area 163g. Therefore, even in the case where the welding electrodes 301 is pressed into the positive electrode lead plate 143 by a strong force, the pressing force is received by the insulator 165.

As a result, it is possible to prevent the connection plate 163 from being deformed, and reliably weld the plurality of positive electrode lead plates 143 to the connection plate 163 by pressing the welding electrodes 301 by a strong force to reduce the contact resistance with the welding electrodes 301. It is necessary to press the welding electrodes 301 by a stronger force as the number of the positive electrode lead plates 143 increases. In the case where the number of the positive electrode lead plates 143 to be welded is three or more, the present disclosure is particularly effective.

Note that in general, through holes are arranged around the outer peripheral area of the connection plate. In the sealing body 122 according to this embodiment, a portion where the through hole 163c does not exist is formed in the outer peripheral area of the connection plate 163 to secure the electrode contact area 163g. In particular, in a lithium ion capacitor, the amount of gas generated at the time of abnormality is smaller than that of a lithium ion secondary battery or the like, and the size of the through hole 163c can be reduced.

Further, as described above, the electrode contact area 163g does not necessarily need to be an area corresponding to the second area 163f, and may be an area that includes the second area 163f and expands to the inner peripheral side from the second area 163f to a certain extent. This is because the welding electrode 301 has a certain thickness and a welding portion can be formed in the second area 163f even in the case of causing the welding electrodes 301 to abut on the electrode contact area 163g.

Figure 15:
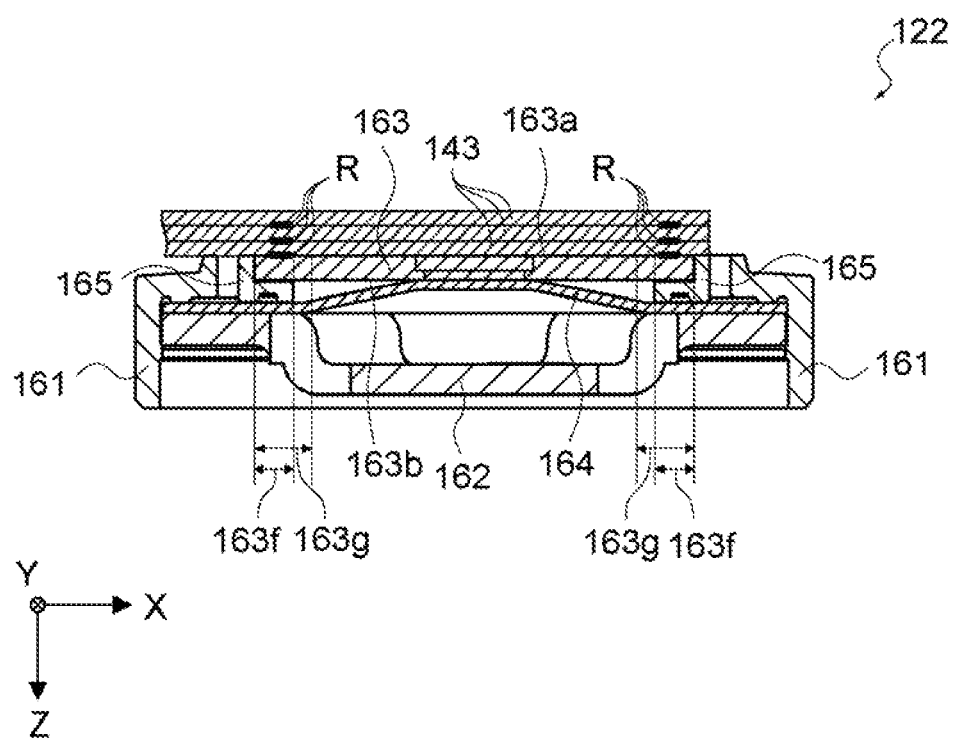
FIG. 15 is a schematic diagram showing a state in which the positive electrode lead plate and the connection plate of the electrochemical device are welded.

FIG. 15 is a schematic diagram showing the state in which the positive electrode lead plate 143 is welded to the connection plate 163. As shown in FIG. 15, on the second area 163f, welding portions R are formed between the positive electrode lead plates 143 and between the positive electrode lead plate 143 and the connection plate 163.

The sealing body 122 is joined to the exterior can 121 after the positive electrode lead plate 143 is welded to the connection plate 163. Further, before or after welding the positive electrode lead plate 143, the negative electrode lead plates 133 can be welded to the exterior can 121. As a result, as shown in FIG. 8, the negative electrode 130 and the positive electrode 140 are electrically connected to the container 120.

Modified Example

The configuration in which the positive electrode lead plate 143 is joined to the sealing body 122 by resistance welding has been described above. However, instead of the positive electrode lead plate 143, the negative electrode lead plates 133 may be joined to the sealing body 122 by the above-mentioned method. In this case, the positive electrode lead plate 143 may be joined to the exterior can 121.

Second Embodiment

Configuration of Electrochemical Device

Figure 16:
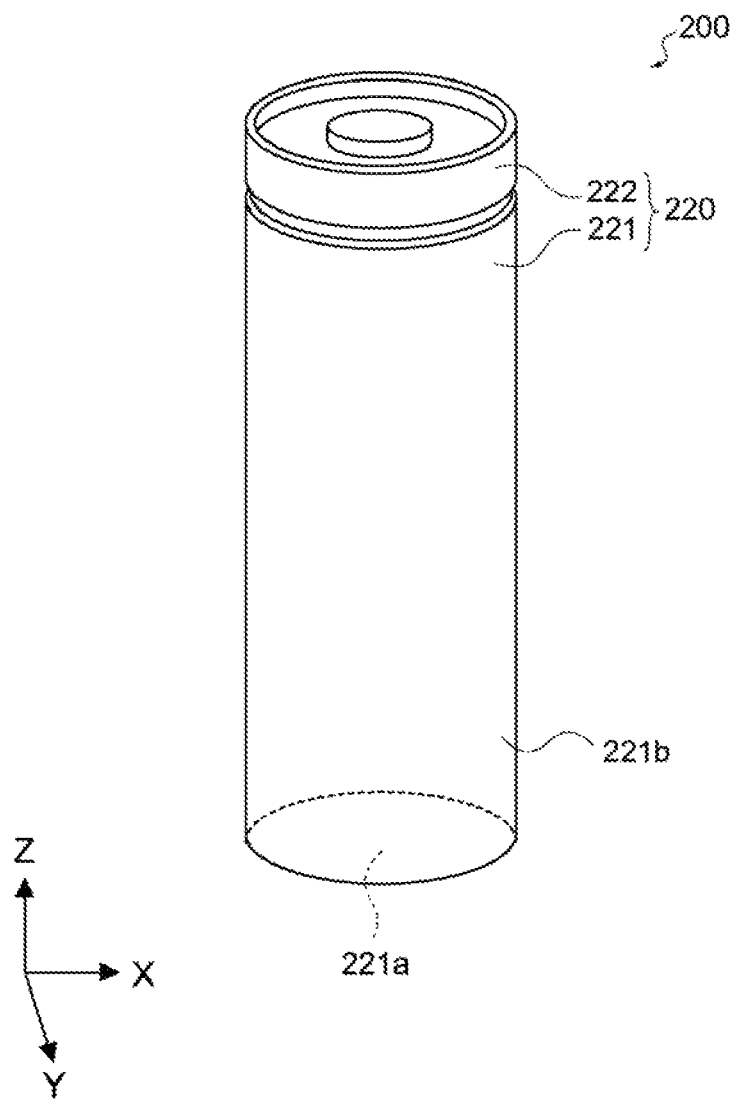
FIG. 16 is a perspective view showing an electrochemical device according to a second embodiment of the present disclosure.

FIG. 16 is a perspective view showing an electrochemical device 200 according to a second embodiment of the present disclosure. The electrochemical device 200 only needs to be a device capable of charging and discharging, and may be any of various electrochemical devices such as a lithium ion capacitor, an electric double layer capacitor, and a lithium ion secondary battery.

The configuration of the electrochemical device 200 according to the second embodiment is the same as that of the electrochemical device 100 according to the first embodiment except for the container. In the following description, the components of the electrochemical device 200 other than the container will be denoted by the same reference symbols as those of the first embodiment, and description thereof will be omitted.

As shown in FIG. 16, the electrochemical device 200 includes a container 220 that houses the electricity storage device 110 (see FIG. 2). The electrochemical device 200 has a cylindrical shape, and can have a diameter (X-Y direction) of 18 mm and a length (Z-direction) of 65 mm, for example.

As shown in FIG. 16, the container 220 includes an exterior can 221 and a sealing body 222.

The exterior can 221 is formed of metal, and include a can bottom portion 221a and a side wall portion 221b. The can bottom portion 221a has a disk shape. The side wall portion 221b has a cylindrical shape that is continuous with the periphery of the can bottom portion 221a. The side wall portion 221b is covered by an insulating film.

The sealing body 222 is formed of metal and joined to the side wall portion 221b to seal the internal space of the exterior can 221

Configuration of Sealing Body

Figure 17:
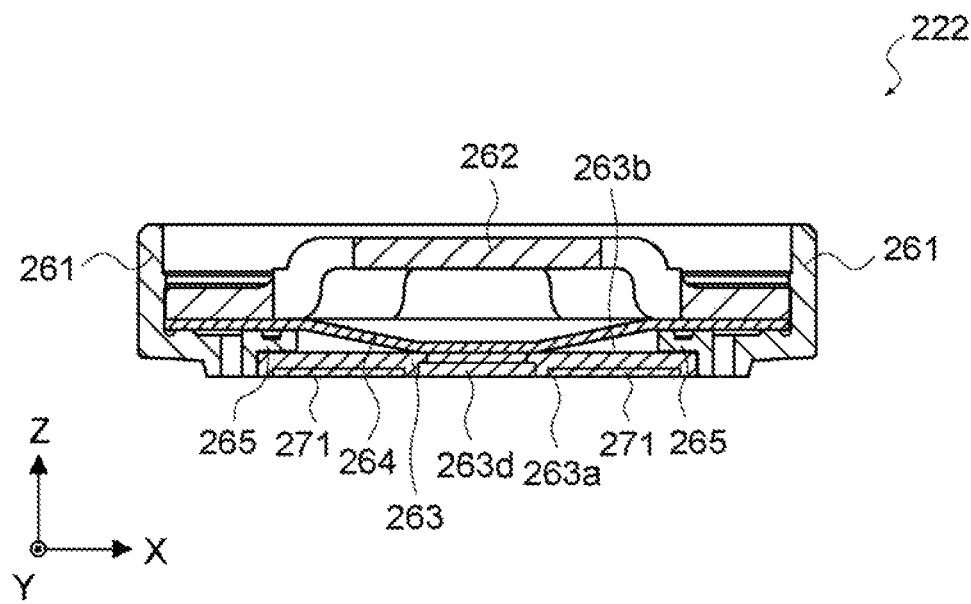
FIG. 17 is a cross-sectional view of a sealing body of the electrochemical device.
Figure 18:
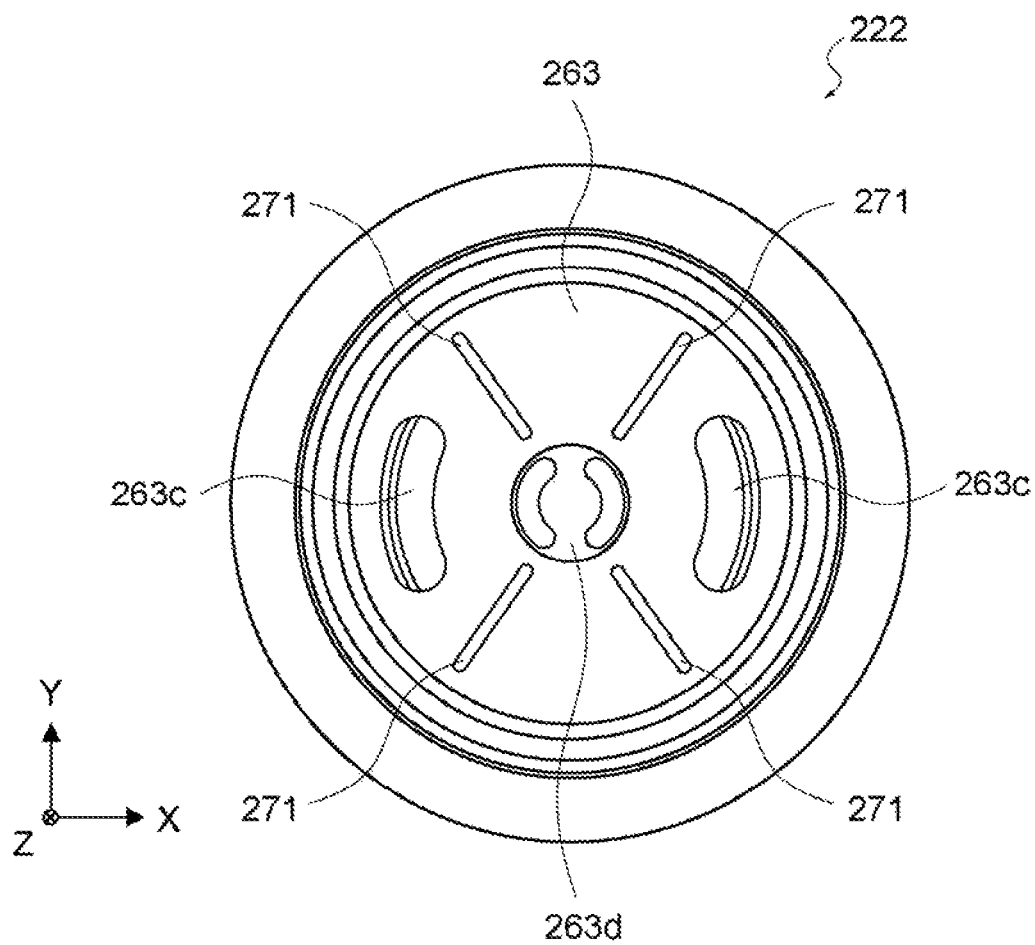
FIG. 18 is a plan view showing the sealing body of the electrochemical device.

FIG. 17 is a cross-sectional view of the sealing body 222. FIG. 18 is a plan view showing the sealing body 222 viewed from the side of the electricity storage device 110.

As shown in the figures, the sealing body 222 includes a frame member 261, an external terminal 262, a connection plate 263, a rupture disc 264, and an insulator 265.

The frame member 261 is fitted to the exterior can 221, and fixes the sealing body 222 to the exterior can 221. The frame member 261 can have an annular shape.

The external terminal 262 is fixed to the frame member 261, and functions as a positive electrode terminal of the electrochemical device 200.

The connection plate 263 has a disk shape, is disposed on the side of the electricity storage device 110 (downward in the figure) in the sealing body 222, and is a portion to which a positive electrode lead plate 243 is joined.

Figure 19:
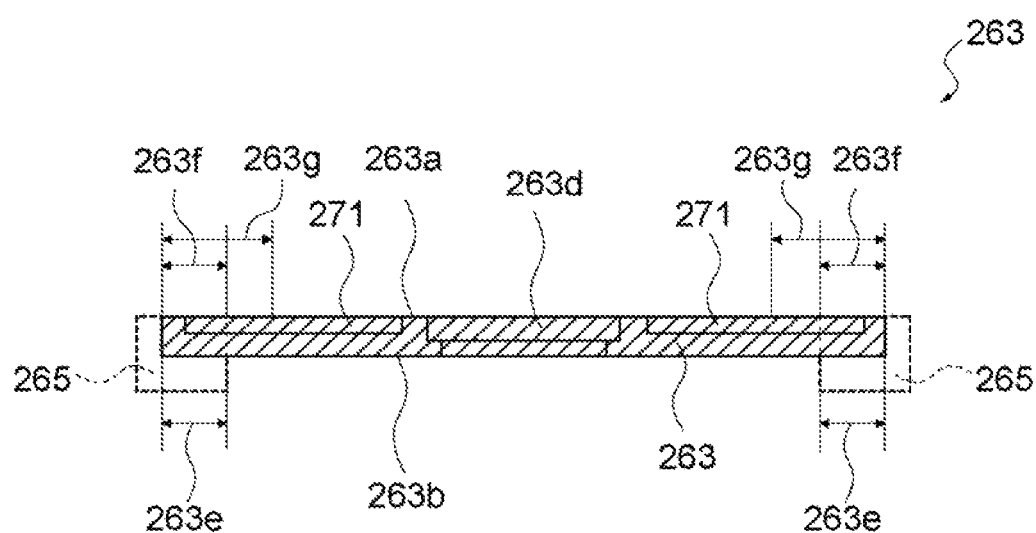
FIG. 19 is a cross-sectional view of a connection plate of the sealing body.
Figure 19:
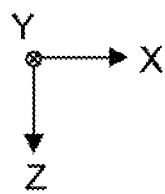

FIG. 19 is a cross-sectional view of the connection plate 263. As shown in FIG. 19, the connection plate 263 includes a first main surface 263a and a second main surface 263b. The first main surface 263a is a surface on the side of the electricity storage device 110, and the second main surface 263b is a surface opposite to the first main surface 263a.

Further, as shown in FIG. 18, the connection plate 263 includes a through hole 263c and a recessed portion 263d. The through hole 263c is a hole that is in communication with the first main surface 263a and the second main surface 263b, and gas generated when an abnormality occurs in the electricity storage device 110 passes through the hole. The number and shape of the through holes 263c are not particularly limited. The through holes 263c are disposed to avoid the area (to be described below) to be welded.

The recessed portion 263d is a portion of the connection plate 263, which has a reduced thickness, and is provided at the inner peripheral portion of the second main surface 263b, and the rupture disc 264 is connected to the portion.

Further, a rib 271 is provided on the first main surface 263a. The rib 271 is a linear recessed portion provided on the first main surface 263a. The rib 271 is formed by performing press processing or the like on the connection plate 263, and formed as a projected portion for the second main surface 263b. The arrangement of the rib 271 will be described later.

The rupture disc 264 is connected to the recessed portion 263d in the second main surface 263b, and electrically connects the connection plate 263 and the external terminal 262. The connection portion of the rupture disc 264 with the recessed portion 263d is broken when gas is generated from the electricity storage device 110, thereby insulating the connection plate 263 and the external terminal 262 from each other.

The insulator 265 is disposed between the rupture disc 264 and the connection plate 263 to insulate the rupture disc 264 and the connection plate 263 from each other. The insulator 265 has an annular shape, and abuts on the outer peripheral area of the second main surface 263b as shown in FIG. 19. In the second main surface 263b, the area on which the insulator 265 abuts will be referred to as "first area 263e".

Figure 20:
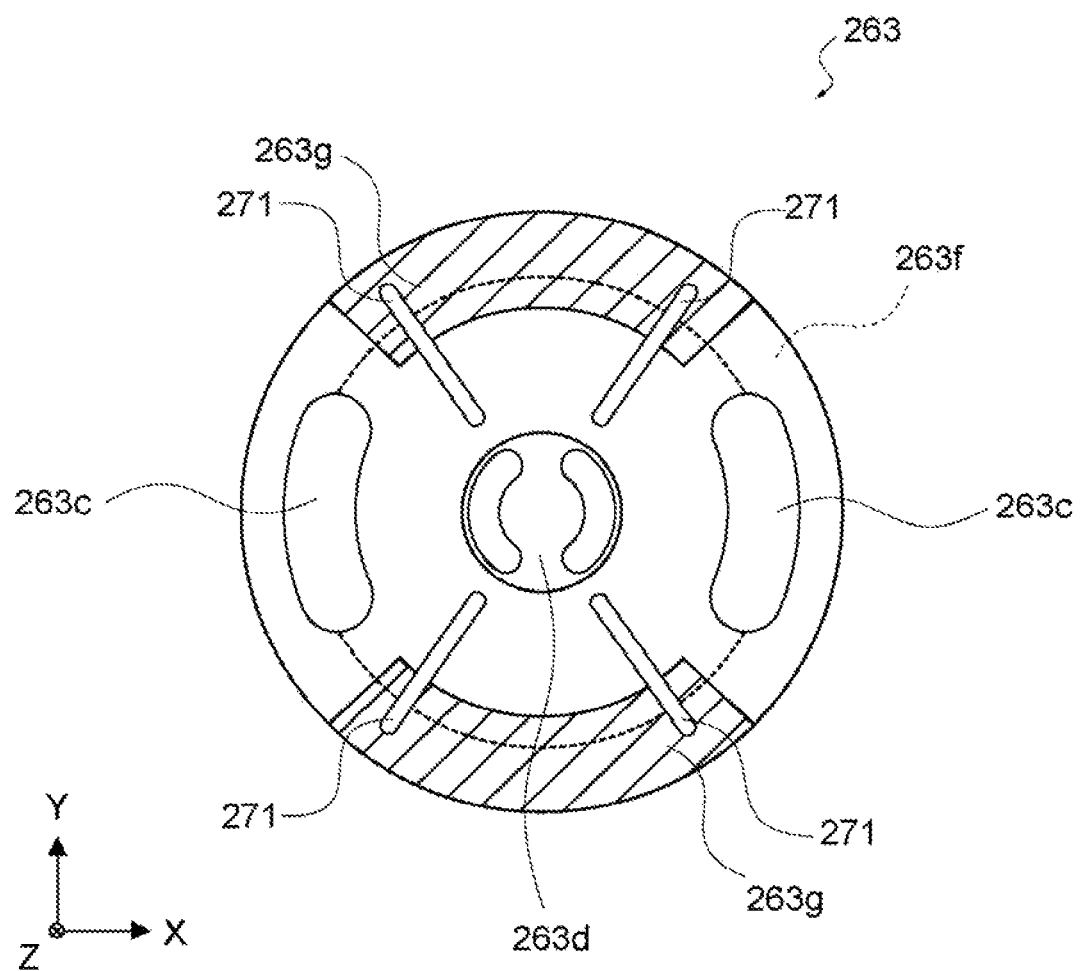
FIG. 20 is a plan view showing the connection plate of the sealing body.

FIG. 20 is a schematic diagram showing the area on the first main surface 263a. As shown in FIG. 19 and FIG. 20, on the first main surface 263a, an area opposite to the first area 263e will be referred to as "second area 263f", and an area that includes the second area 263f and is separated from the through hole 263c and the rib 271 will be referred to as "electrode contact area 263g".

The frame member 261, the external terminal 262, the connection plate 263, and the rupture disc 264 are each formed of a metal material, and are each favorably formed of the same material. Examples of such a material include aluminum, an alloy containing aluminum, and stainless steel. The insulator 265 is formed of an insulating material such as a resin.

Regarding Welding of Connection Plate to Positive Electrode Lead Plate

Figure 21:
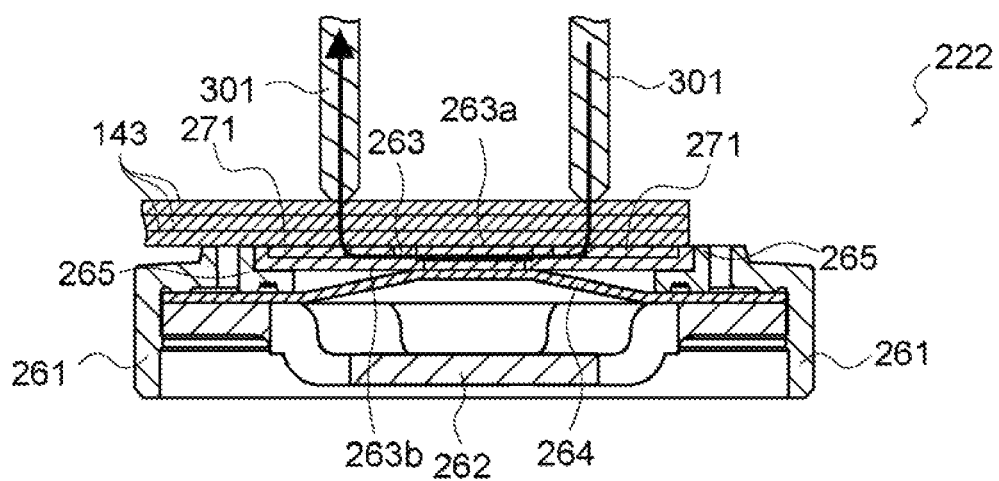
FIG. 21 is a schematic diagram showing a method of resistance welding of a positive electrode lead plate and a connection plate of an electrochemical device according to an embodiment of the present disclosure.
Figure 21:
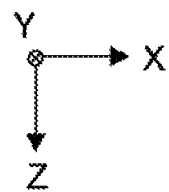
Figure 22:
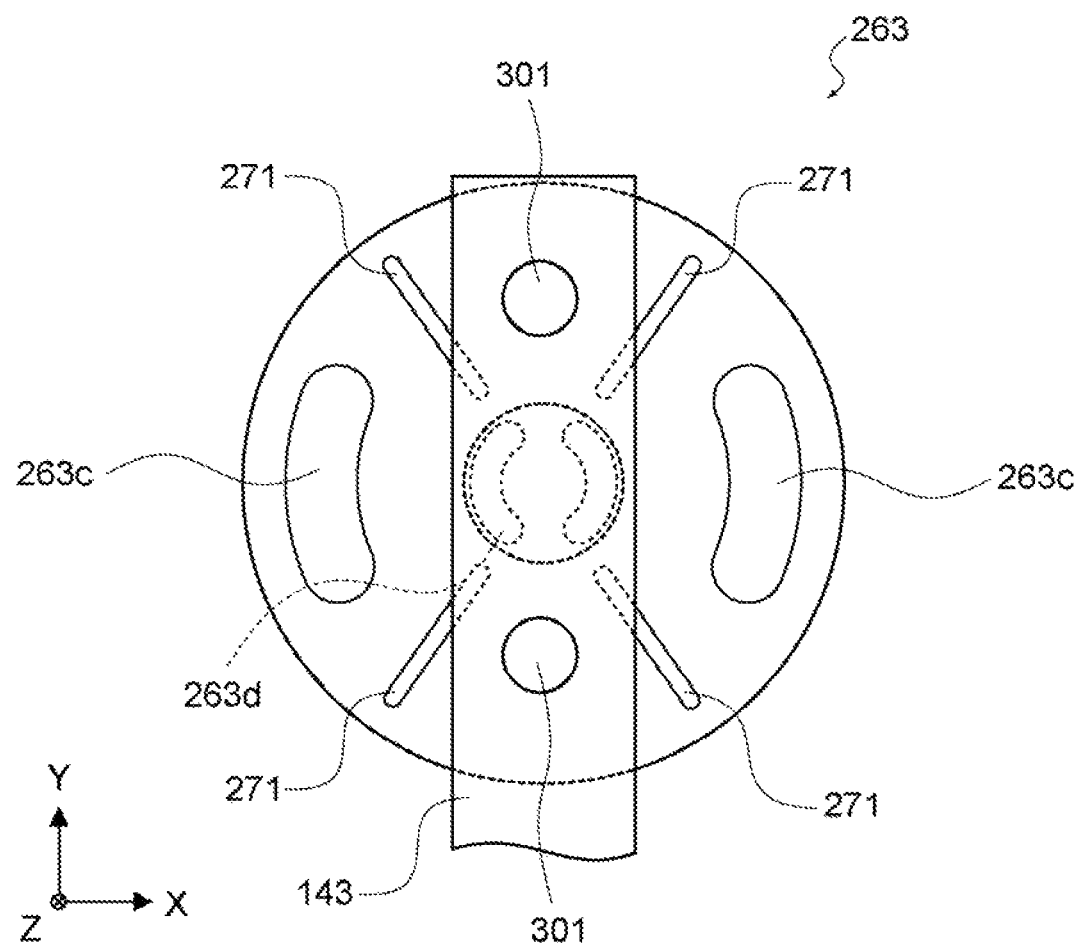
FIG. 22 is a schematic diagram showing the method of resistance welding of the positive electrode lead plate and the connection plate of the electrochemical device.

As described above, the positive electrode lead plate 143 (see FIG. 6) is electrically connected to the sealing body 222. Specifically, the positive electrode lead plate 143 is welded to the connection plate 263 by resistance welding. FIG. 21 is a cross-sectional view when welding the positive electrode lead plate 143 to the connection plate 263, and FIG. 22 is a plan view at this time.

As shown in the figures, at the time of welding, the positive electrode lead plate 143 is disposed to overlap the first main surface 263a, and the two welding electrodes 301 are pressed into the positive electrode lead plate 143. In this state, a current is applied between the two welding electrodes 301. As a result, a current flows between the two welding electrodes 301 via the positive electrode lead plate 143 and the connection plate 263 as shown by an arrow. Thus, the positive electrode lead plates 143 are welded, and the positive electrode lead plate 143 and the connection plate 263 are welded (resistance welding).

As described above, the rupture disc 264 and the external terminal 262 are provided on the side of the second main surface 263b of the connection plate 263, and a welding electrode cannot be disposed on the side of the second main surface 263b. For this reason, it is necessary to perform resistance welding (series resistance welding) by causing the two welding electrodes 301 to abut on the side of the first main surface 263a to cause a current to flow between the two electrodes.

Note that in the case where the number of the positive electrode lead plates 143 to be welded is two or more, it is necessary to press the welding electrodes 301 into the positive electrode lead plate 143 with a strong force in order to reduce the contact resistance with the welding electrodes 301. In particular, in the case where the number of the positive electrode lead plates 143 is three or more, it is necessary to press the welding electrodes 301 with a force exceeding 50 N.

There is a possibility that the sealing body having the existing structure cannot withstand the pressing force of the welding electrodes 301 and the connection plate is deformed.

However, in the sealing body 222 according to the embodiment of the present disclosure, the rib 271 is provided in the first main surface 263a as described above. By providing the rib 271, the strength of the connection plate 263 is improved, and the connection plate 263 is prevented from being deformed even in the case where the welding electrodes 301 are pressed with a force exceeding 50 N.

As a result, it is possible to reliably weld the plurality of positive electrode lead plates 143 to the connection plate 263 by pressing the welding electrodes 301 with a strong force to reduce the contact resistance with the welding electrodes 301.

Figure 23:
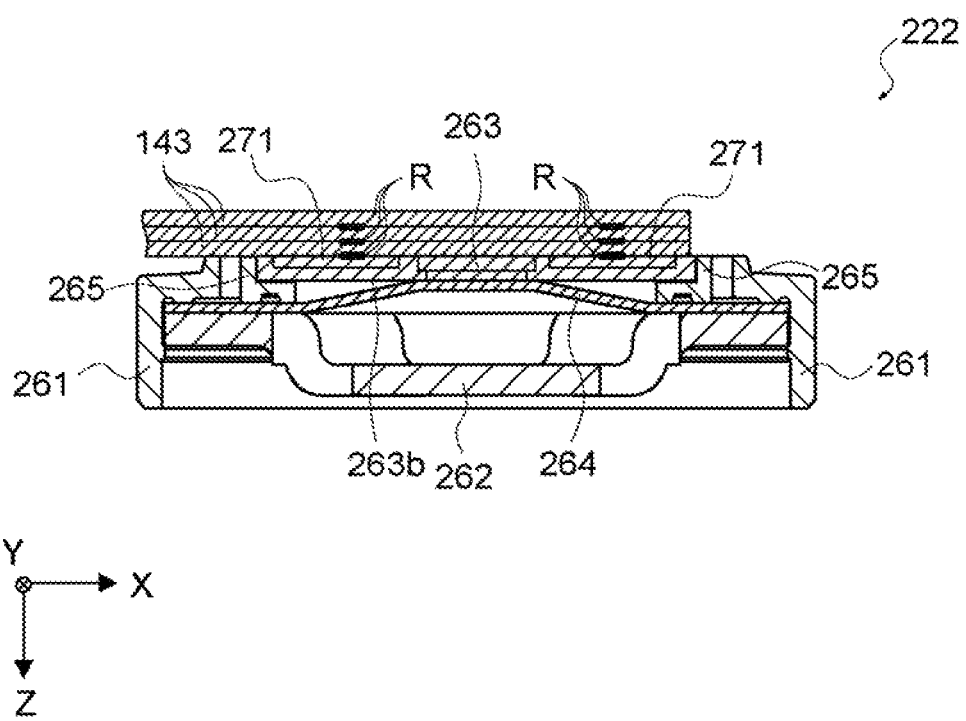
FIG. 23 is a schematic diagram showing a state in which the positive electrode lead plate and the connection plate of the electrochemical device are welded.

FIG. 23 is a schematic diagram showing the state in which the positive electrode lead plate 143 is welded to the connection plate 263. As shown in FIG. 23, welding portions R are formed between the positive electrode lead plates 143 and between the positive electrode lead plate 143 and the connection plate 263.

Figure 24:
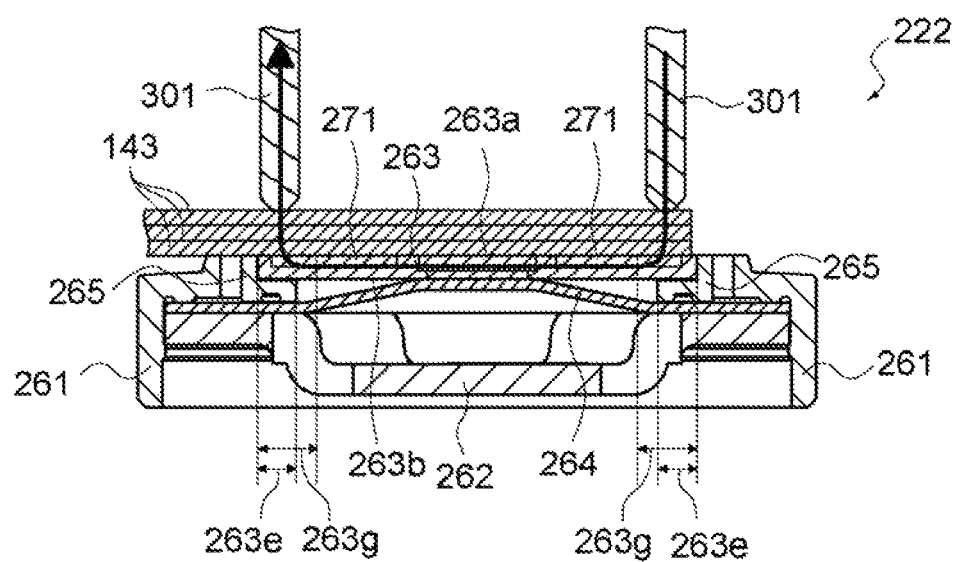
FIG. 24 is a schematic diagram showing the method of resistance welding of the positive electrode lead plate and the connection plate of the electrochemical device.
Figure 24:
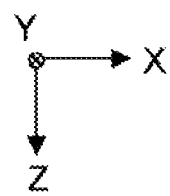
Figure 25:
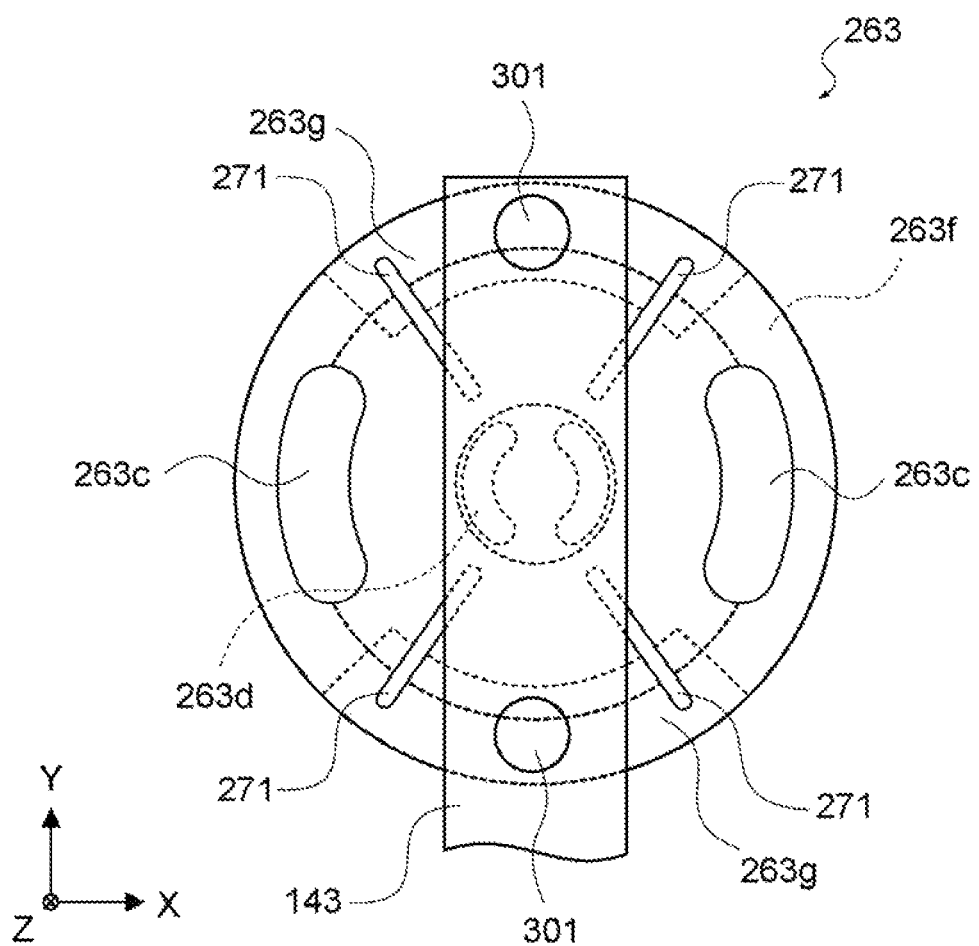
FIG. 25 is a schematic diagram showing the method of resistance welding of the positive electrode lead plate and the connection plate of the electrochemical device.

Further, it is more favorable to press the welding electrodes 301 into the positive electrode lead plate 143 on the above-mentioned electrode contact area 263g (see FIG. 20). FIG. 24 and FIG. 25 are each a schematic diagram showing the welding electrodes 301 to be pressed by the positive electrode lead plate 143 on the electrode contact area 263g.

As shown in the figures, resistance welding can be performed so that the welding electrodes 301 is pressed into the positive electrode lead plate 143 on the electrode contact area 263g to form a welding portion in the second area 263f. There is the first area 263e on which the insulator 265 abuts on the second main surface 263b that is the back surface of the electrode contact area 263g. For this reason, even in the case where the welding electrodes 301 is pressed into the positive electrode lead plate 143 with a strong force, the pressing force is received by the insulator 265.

As a result, the strength of the connection plate 263 is improved by the rib 271, and the connection plate 263 is prevented from being deformed by a pressing force. Therefore, it is possible to reliably weld the plurality of positive electrode lead plates 143 to the connection plate 263 by pressing the welding electrodes 301 with a stronger force to reduce the contact resistance.

Note that in general, through holes are arranged around the outer peripheral area of the connection plate. In the sealing body 222 according to this embodiment, a portion where the through hole 263c does not exist is formed in the outer peripheral area of the connection plate 263 to secure the electrode contact area 263g. In particular, in a lithium ion capacitor, the amount of gas generated at the time of abnormality is smaller than that of a lithium ion secondary battery or the like, and the size of the through hole 263c can be reduced.

Further, as described above, the electrode contact area 263g does not necessarily need to be an area corresponding to the second area 263f, and may be an area that includes the second area 263f and expands to the inner peripheral side from the second area 263f to a certain extent. This is because the welding electrode 301 has a certain thickness and a welding portion can be formed in the second area 263f even in the case of causing the welding electrodes 301 to abut on the electrode contact area 263g.

The sealing body 222 is joined to the exterior can 221 after the positive electrode lead plate 143 is welded to the connection plate 263. Further, before or after welding the positive electrode lead plate 143, the negative electrode lead plates 133 (see FIG. 5) can be welded to the exterior can 221. As a result, the negative electrode 130 and the positive electrode 140 (see FIG. 3) are electrically connected to the container 220.

Regarding Arrangement of Rib

Figure 26:
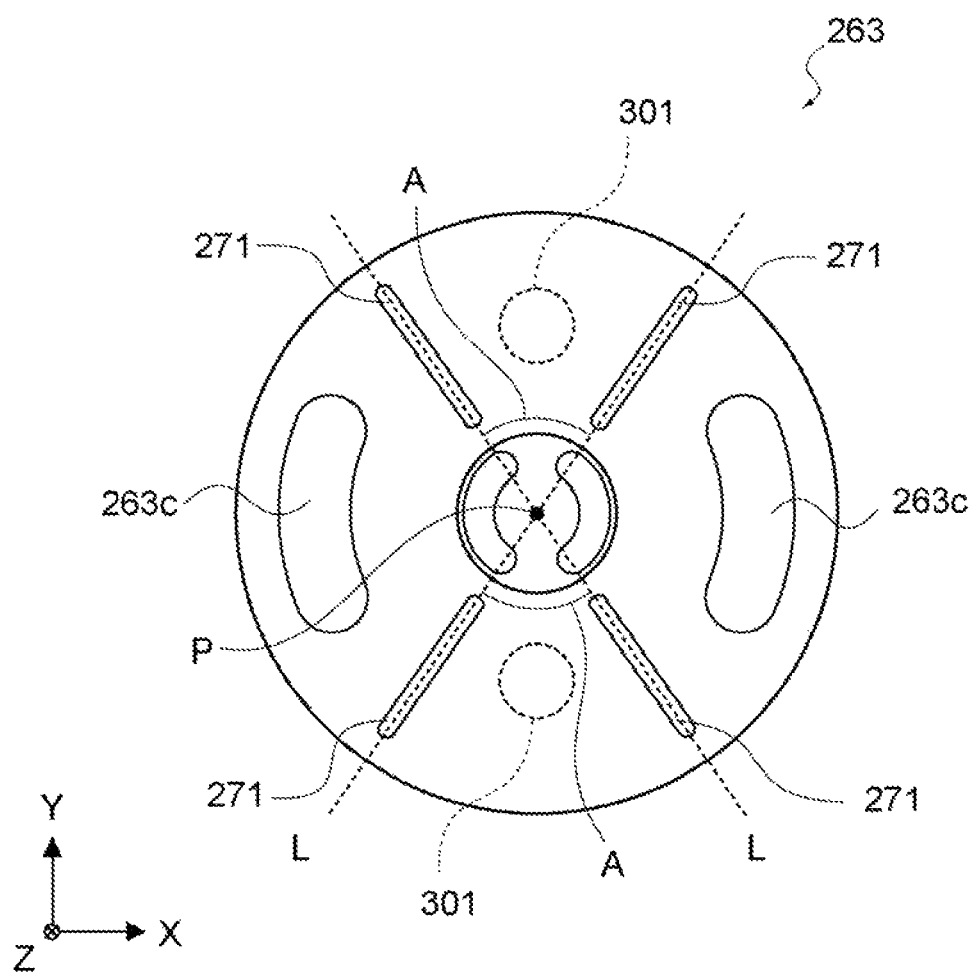
FIG. 26 is a plan view showing arrangement of ribs of the connection plate of the electrochemical device.

FIG. 26 is a schematic diagram showing the arrangement of the ribs 271. As shown in FIG. 26, the ribs 271 are each formed along a straight line L that passes through a central point P of the first main surface 263a, and can be formed on a straight line that radially extends from the central point P toward the periphery of the first main surface 263a. Specifically, the rib 271 can be formed along the radius of the connection plate 263. As shown in FIG. 26, the ribs 271 are located between the abut portions of the through holes 263c and the abut portions of the welding electrodes 301, and it is favorable that the ribs 271 are arranged to form a pair with the welding electrodes 301 sandwiched therebetween.

Since the welding electrodes 301 are abuts on the two portions on the first main surface 263a as described above, two pairs of the ribs 271 can be disposed. The angle formed by the ribs 271 in each pair, i.e., an angle A formed by the two straight lines is favorably 90 degrees or less.

Figure 27:
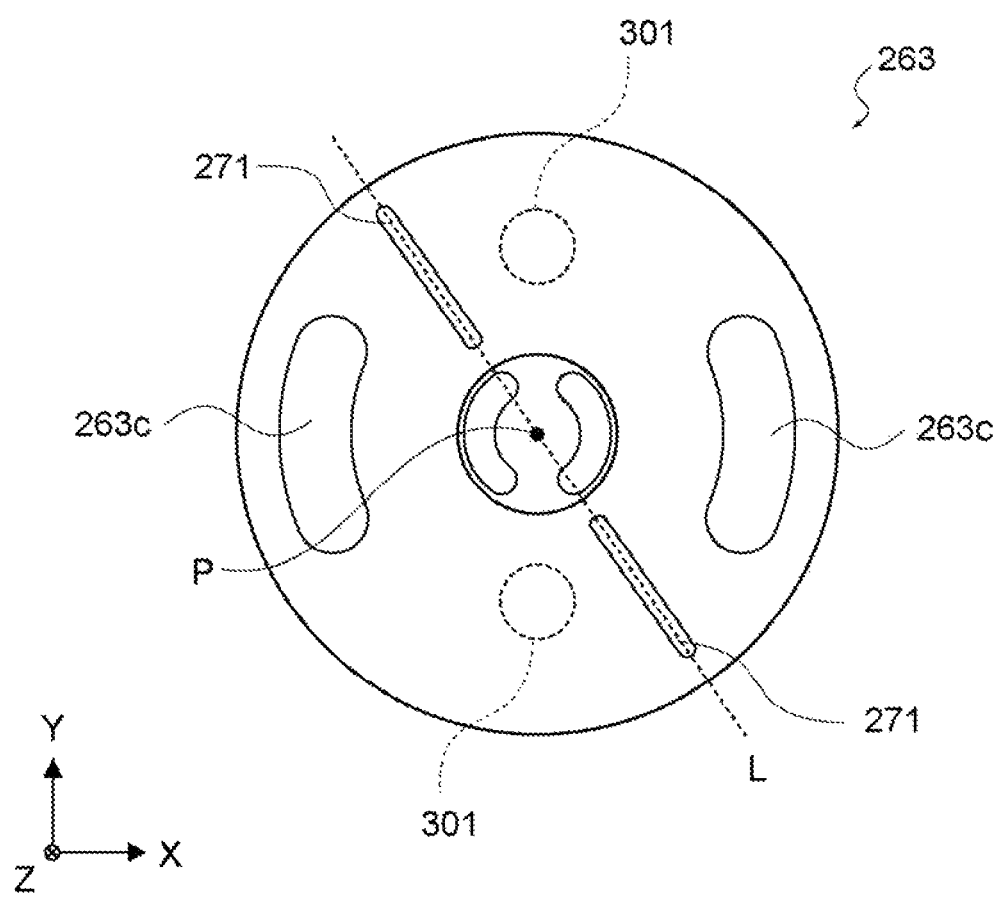
FIG. 27 is a plan view showing arrangement of the ribs of the connection plate of the electrochemical device.
Figure 28:
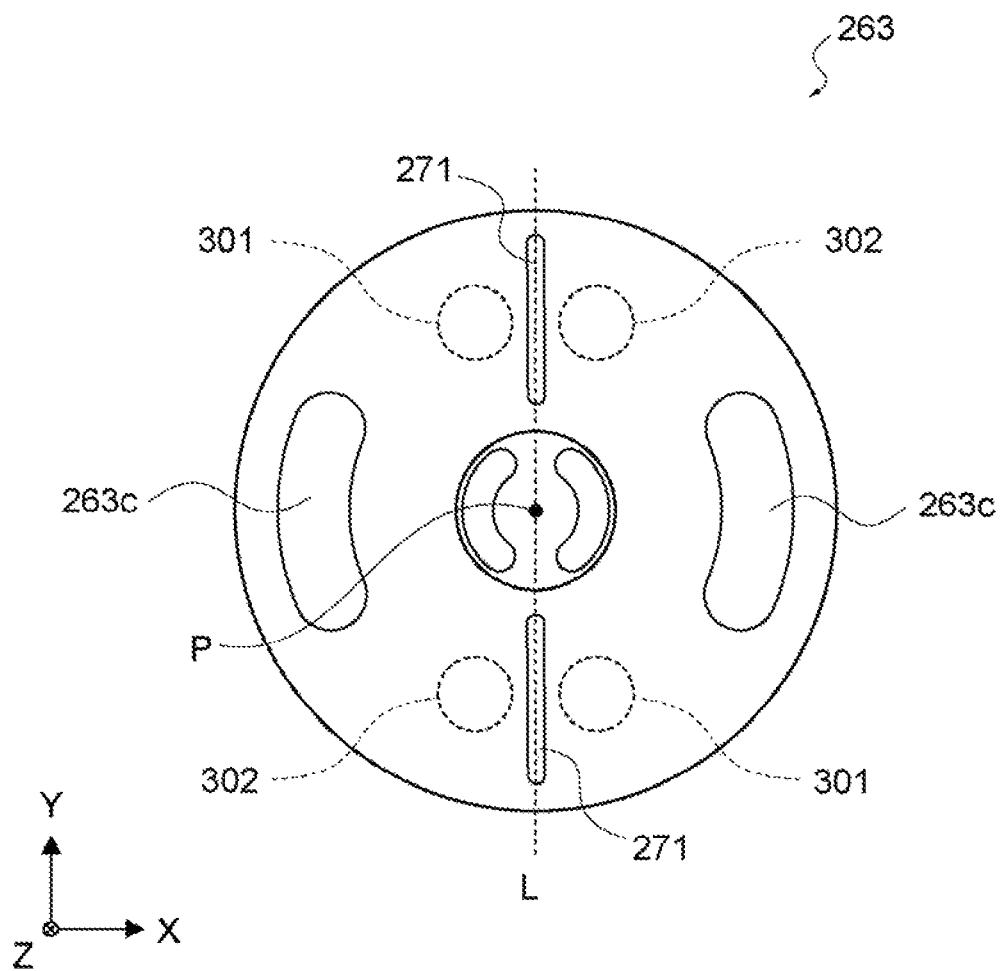
FIG. 28 is a plan view showing arrangement of the ribs of the connection plate of the electrochemical device.

Further, the arrangement of the ribs 271 is not limited the above. FIG. 27 and FIG. 28 are each a schematic diagram showing another arrangement example of the ribs 271. As shown in FIG. 27, one rib 271 may be provided for each of the welding electrodes 301.

Further, resistance welding of the positive electrode lead plate 143 may be performed in two steps. As shown in FIG. 28, after performing resistance welding by pressing the welding electrodes 301 on one side of the rib 271, resistance welding can be performed by pressing welding electrodes 302 into the opposite side of the rib 271.

In addition, it only needs to arrange the ribs 271 so that the strength of the connection plate 263 is improved against the pressing force of the welding electrodes 301 on the connection plate 263.

Modified Example

Although the configuration in which the positive electrode lead plate 143 is joined to the sealing body 222 by resistance welding has been described, instead of the positive electrode lead plate 143, the negative electrode lead plates 133 may be joined to the sealing body 222 by the above-mentioned method. In this case, the positive electrode lead plate 143 may be joined to the exterior can 221.

It should be understood by those skilled in the art that various modifications, combinations, sub-combinations and alterations may occur depending on design requirements and other factors insofar as they are within the scope of the appended claims or the equivalents thereof.

What is claimed is:

1. An electrochemical device, comprising:
   an electricity storage device that includes a positive electrode, a negative electrode, and a separator, the positive electrode and the negative electrode being stacked via the separator and wound, the electricity storage device further including a plurality of lead plates electrically connected to one of the positive electrode and the negative electrode;
   a connection plate having a first main surface on a side of the electricity storage device and a second main surface opposite to the first main surface, the plurality of lead plates being stacked and welded to the first main surface;
   a rupture disc connected to the second main surface of the connection plate; and
   an insulator that abuts on a first area and insulates the connection plate and the rupture disc from each other, the first area being an outer peripheral area of the second main surface,
   the plurality of lead plates being welded to a second area of the first main surface, the second area being opposite to the first area.

2. The electrochemical device according to claim 1, wherein
   the plurality of lead plates is welded to the connection plate at two portions in the second area.

3. The electrochemical device according to claim 1, wherein
   the number of the plurality of lead plates welded to the connection plate is not less than three.

4. The electrochemical device according to claim 1, wherein
   the electrochemical device is a lithium ion capacitor.

5. The electrochemical device according to claim 1, wherein
   a rib is provided on the first main surface of the connection plate.

6. The electrochemical device according to claim 5, wherein
   the first main surface has a circular shape, and
   the rib is formed along a radius of the connection plate.

7. The electrochemical device according to claim 5, wherein
   the connection plate includes a through hole in communication with the first main surface and the second main surface, and
   the rib is provided between a welding portion of the plurality of lead plates and the through hole.

8. A method of producing an electrochemical device, comprising:
   preparing
      an electricity storage device that includes a positive electrode, a negative electrode, and a separator, the positive electrode and the negative electrode being stacked via the separator and wound, the electricity storage device further including a plurality of lead plates electrically connected to one of the positive electrode and the negative electrode, a connection plate having a first main surface on a side of the electricity storage device and a second main surface opposite to the first main surface,
a rupture disc connected to the second main surface of the connection plate, and
an insulator that abuts on a first area and insulates the connection plate and the rupture disc from each other, the first area being an outer peripheral area of the second main surface;

stacking the plurality of lead plates and causing the plurality of stacked lead plates to abut on the first main surface; and causing a first welding electrode and a second welding electrode to abut on the plurality of lead plates in an electrode contact area including a second area of the first main surface, the second area being opposite to the first area, and applying a current between the first welding electrode and the second welding electrode to weld the plurality of lead plates to the connection plate in the second area.

* * * * *